United States Patent
Park et al.

(10) Patent No.: US 9,516,086 B2
(45) Date of Patent: Dec. 6, 2016

(54) TRANSMITTING DEVICE, RECEIVING DEVICE, AND TRANSCEIVING METHOD THEREOF

(75) Inventors: Hong-seok Park, Anyang-si (KR); Byung-sun Kim, Goyang-si (KR); Sang-jin Hahm, Seoul (KR); Jin-mo Kang, Seoul (KR); Keun-sik Lee, Seoul (KR); Jae-jun Lee, Suwon-si (KR); Yong-seok Jang, Hwaseong-si (KR); Hee-jean Kim, Yongin-si (KR); Dae-jong Lee, Hwaseong-si (KR); Yu-sung Joo, Yongin-si (KR)

(73) Assignees: SAMSUNG ELECTRONICS CO., LTD., Suwon-si (KR); KOREAN BROADCASTING SYSTEM, Seoul (KR)

( * ) Notice: Subject to any disclaimer, the term of this patent is extended or adjusted under 35 U.S.C. 154(b) by 256 days.

(21) Appl. No.: 14/238,664

(22) PCT Filed: Aug. 13, 2012

(86) PCT No.: PCT/KR2012/006458
§ 371 (c)(1),
(2), (4) Date: Feb. 12, 2014

(87) PCT Pub. No.: WO2013/025035
PCT Pub. Date: Feb. 21, 2013

(65) Prior Publication Data
US 2014/0204962 A1 Jul. 24, 2014

Related U.S. Application Data

(60) Provisional application No. 61/545,283, filed on Oct. 10, 2011, provisional application No. 61/522,881, filed on Aug. 12, 2011, provisional application No. 61/522,854, filed on Aug. 12, 2011.

(30) Foreign Application Priority Data

Aug. 13, 2012 (KR) ........................ 10-2012-0088496

(51) Int. Cl.
*H04L 29/06* (2006.01)
*H04N 21/2389* (2011.01)
(Continued)

(52) U.S. Cl.
CPC ......... *H04L 65/607* (2013.01); *H04L 65/4076* (2013.01); *H04N 21/2389* (2013.01); *H04N 21/631* (2013.01); *H04N 21/8456* (2013.01); *H04N 21/8547* (2013.01)

(58) Field of Classification Search
None
See application file for complete search history.

(56) References Cited

U.S. PATENT DOCUMENTS

| 2009/0013363 A1 | 1/2009 | Lee et al. |
| 2011/0010739 A1* | 1/2011 | Yun ................... H04N 13/0048 725/39 |

(Continued)

FOREIGN PATENT DOCUMENTS

| EP | 2288170 A2 | 2/2011 |
| EP | 2503779 A2 | 9/2012 |

(Continued)

OTHER PUBLICATIONS

International Search Report dated Jan. 24, 2013 issued in International Application No. PCT/KR2012/006458 (PCT/ISA/210).

(Continued)

*Primary Examiner* — Christine Duong
(74) *Attorney, Agent, or Firm* — Sughrue Mion, PLLC

(57) ABSTRACT

A transmitting device which transmits a plurality of streams is provided. The transmitting device comprises: a first multimedia data consisting of multimedia contents; a first synchronization information for synchronization of a second multimedia data consisting of multimedia contents; a first transmitting data including a first signaling data for the first multimedia data and a second signaling data for the second multimedia data, a data generating unit generating a second transmitting data including a second synchronization information for synchronization of the second multimedia data and the first multimedia data, a first transmitting unit transmitting the first transmitting data supplied from the data generating unit to a receiving device through a broadcasting network, and a second transmitting unit transmitting the second transmitting data supplied from the data generating unit to the receiving device through an IP network.

13 Claims, 37 Drawing Sheets

(51) Int. Cl.
*H04N 21/63* (2011.01)
*H04N 21/845* (2011.01)
*H04N 21/8547* (2011.01)

(56) References Cited

U.S. PATENT DOCUMENTS

| | | |
|---|---|---|
| 2012/0042333 A1 | 2/2012 | Lee et al. |
| 2013/0133014 A1 | 5/2013 | Kim |
| 2014/0125780 A1* | 5/2014 | Suh .................... H04N 13/0048 348/51 |

FOREIGN PATENT DOCUMENTS

| | | |
|---|---|---|
| EP | 2645727 A2 | 10/2013 |
| KR | 10-0738930 B1 | 7/2007 |
| KR | 10-2009-0003809 A | 1/2009 |
| KR | 10-2010-0104077 A | 9/2010 |
| KR | 10-2011-0014821 A | 2/2011 |
| WO | 2010/053246 A2 | 5/2010 |
| WO | 2011/062386 A2 | 5/2011 |
| WO | 2012/077987 A2 | 6/2012 |

OTHER PUBLICATIONS

Fernando, et al.; "Technologies under Consideration (TuC) for MMT", International Organisation for Standardisation ISO/IEC JTC1/SC29/WG11 M21213, Jul. 2011, 67 pages total.

Communication dated Feb. 11, 2015, issued by the European Patent Office in counterpart European Application No. 12824417.5.

Communication issued Aug. 24, 2016, issued by the European Patent Office in counterpart European Patent Application No. 12824417.5.

* cited by examiner

FIG. 4

| | 8-bit Data | | | | | | | | | 10-bit Data | |
|---|---|---|---|---|---|---|---|---|---|---|---|
| | D9 (MSB) | D8 | D7 | D6 | D5 | D4 | D3 | D2 | D1 | D0 | |
| ancillary data flag(ADF) | 0 | 0 | 0 | 0 | 0 | 0 | 0 | 0 | 0 | 0 | |
| | 1 | 1 | 1 | 1 | 1 | 1 | 1 | 1 | 1 | 1 | |
| | 1 | 1 | 1 | 1 | 1 | 1 | 1 | 1 | 1 | 1 | |
| data ID(DID) | $\overline{D8}$ | EP | 0 | 1 | 1 | 0 | 0 | 0 | 0 | 0 | |
| SDID | $\overline{D8}$ | EP | 0 | 1 | 1 | 0 | 0 | 0 | 0 | 0 | |
| data count(DC) | $\overline{D8}$ | EP | 0 | 0 | 0 | 1 | 0 | 0 | 0 | 0 | |
| timecode data | $\overline{D8}$ | EP | units of frames | | | | DBB10 | 0 | 0 | 0 | |
| | $\overline{D8}$ | EP | user group 1 | | | | DBB11 | 0 | 0 | 0 | |
| | $\overline{D8}$ | EP | flag2 | flag1 | tens of frames | | DBB12 | 0 | 0 | 0 | |
| | $\overline{D8}$ | EP | user group 2 | | | | DBB13 | 0 | 0 | 0 | |
| | $\overline{D8}$ | EP | units of seconds | | | | DBB14 | 0 | 0 | 0 | |
| | $\overline{D8}$ | EP | user group 3 | | | | DBB15 | 0 | 0 | 0 | |
| | $\overline{D8}$ | EP | flag3 | tens of seconds | | | DBB16 | 0 | 0 | 0 | |
| | $\overline{D8}$ | EP | user group 4 | | | | DBB17 | 0 | 0 | 0 | |
| | $\overline{D8}$ | EP | units of minutes | | | | DBB20 | 0 | 0 | 0 | |
| | $\overline{D8}$ | EP | user group 5 | | | | DBB21 | 0 | 0 | 0 | |
| | $\overline{D8}$ | EP | flag4 | tens of minutes | | | DBB22 | 0 | 0 | 0 | |
| | $\overline{D8}$ | EP | user group 6 | | | | DBB23 | 0 | 0 | 0 | |
| | $\overline{D8}$ | EP | units of hours | | | | DBB24 | 0 | 0 | 0 | |
| | $\overline{D8}$ | EP | user group 7 | | | | DBB25 | 0 | 0 | 0 | |
| | $\overline{D8}$ | EP | flag6 | flag5 | tens of hours | | DBB26 | 0 | 0 | 0 | |
| | $\overline{D8}$ | EP | user group 8 | | | | DBB27 | 0 | 0 | 0 | |
| check sum | $\overline{D8}$ | Sum of D0_D8 of data ID through last timecode data word. Preset to all zeros; carry is ignored. | | | | | | | | | |

FIG. 6

| group_of_pictures_header0 { | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code0 | | |
| } | | |

FIG. 7

| pic_timing(payloadSize) { | C | Descriptor |
|---|---|---|
|   if(CpbDpbDelaysPresentFlag) { | | |
|     cpb_removal_delay | 5 | u(v) |
|     dpb_output_delay | 5 | u(v) |
|   } | | |
|   if(pic_struct_present_flag) { | | |
|     pic_struct | 5 | u(4) |
|     for(i=0; i<NumClockTS ; i++) { | | |
|       clock_timestamp_flag[i] | 5 | u(1) |
|       if(clock_timestamp_flag[i]0 { | | |
|         ct_type | 5 | u(2) |
|         nuit_field_based_flag | 5 | u(1) |
|         counting_type | 5 | u(5) |
|         full_timestamp_flag | 5 | u(1) |
|         discontinuity_flag | 5 | u(1) |
|         cnt_dropped_flag | 5 | u(1) |
|         n_frames | 5 | u(8) |
|         if(full_timestamp_flag){ | | |
|           seconds_value/*0...59*/ | 5 | u(6) |
|           minutes_value/*0...59*/ | 5 | u(6) |
|           hours_value/*0...23*/ | 5 | u(5) | time_code

FIG. 8

| Syntax | No. of bits | Mnemonic |
|---|---|---|
| TS_program_map_section(){ | | |
| table_id | 8 | uimsbf |
| section_syntax_indicator | 1 | bslbf |
| '0' | 1 | bslbf |
| reserved | 2 | bslbf |
| section_length | 12 | uimsbf |
| program_number | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved | 3 | bslbf |
| PCR_PID | 13 | uimsbf |
| reserved | 4 | bslbf |
| program_info_length | 12 | uimsbf |
| for(i=0; i<N; i++){ | | |
| descriptor() | | |
| } | | |
| for(i=0; i<N1; i++){ | | |
| stream_type | 8 | uimsbf |
| reserved | 3 | bslbf |
| elementary_PID | 14 | uimsbf |
| reserved | 4 | bslbf |
| ES_info_length | 12 | uimsbf |
| for(i=0; i<N2; i++){ | | |
| descriptor() | | |
| } | | |
| } | | |
| CRC_32 | 32 | rpchof |
| } | | |

There are loops as many as ES

| Value | |
|---|---|
| 0x00 | ITU-T | ISO/IEC Reserved |
| 0x01 | ISO/IEC 11172-2 Video |
| 0x02 | ITU-T Rec. H.262 ISO IEC 13818-2 Video or ISO/IEC 11172-2 ????? parameter video stream |
| 0x03 | ISO/IEC 11172-3 Audio |
| 0x04 | ISO/IEC 13818-3 Audio |
| 0x05 | ITU-T Rec. H.222.0 | ISO/IEC 13818-1 private sectiones |
| 0x06 | ITU-T Rec. H.222.0 | ISO/IEC 13818-1 PES packets containing private data |
| 0x07 | ISO/IEC 13522 MHEG |
| 0x08 | ITU-T Rec. H.222.0 | ISO/IEC 13818-1 Annex ADSM-CC |
| 0x09 | ITU-T Rec. H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ITU-T Rec. H.222.0 | ISO/IEC 13818-1 ????? |
| 0x0F | ISO/IEC 13818-7 Audio with ADTS transport syntax |
| 0x10 | ISO/IEC 14496-2 Visual |
| 0x11 | ISO/IEC 14496-3 Audio with the LATM transport syntax as defined in ISO/IEC 14496-3 |
| 0x12 | ISO/IEC 14496-1 SL-packetized stream or Flex??? stream carried in PES packets |
| 0x13 | ISO/IEC 14496-1 SL-packetized stream or Flex??? stream carried in ISO/IEC 14496 sections |
| 0x14 | ISO/IEC 13818-6 Synchronized Download Protocol |
| 0x15 | Metadata carried in Pes packets |
| 0x16 | Metadata carried in metadata sections |
| 0x17 | Metadata carried in ISO/IEC 13818-6 Data Carousel |
| 0x18 | Metadata carried in ISO/IEC 13818-6 Object Carousel |
| 0x19 | Metadata carried in ISO/IEC 13818-6 Synchronized Download Protocol |
| 0x1A | IPMP stream (defined in ISO/IEC 13818-11, MPEG-2 IPMP) |
| 0x1B | AVC video stream as defined in ITU-T Rec. H 264 | ISO/IEC 14496-10 Video |
| 0x1C | ISO/IEC 14496-3 Audio, without using any additional transport syntax, such as DST, ALS and SLS |
| 0x1D | ISO/IEC 14496-17 Text |
| 0x1E | Auxiliary video stream as defined in ISO/IEC 23002-3 |
| 0x1F-0x7E | ITU-T Rec. H.222 ISO/IEC 13818-1 Reserved |
| 0x7F | IPMP stream |
| 0x80-0xFF | User Private |

FIG. 9

| | PSIP Tables: | |
|---|---|---|
| 0xC7 | MASTER GUIDE TABLE (MGT) | 0x1FFB |
| 0xC8 | TERRESTRIAL VIRTUAL CHANNEL TABLE(TVCT) | 0x1FFB |
| 0xC9 | CABLE VIRTUAL CHANNEL TABLE(CVCT) | 0x1FFB |
| 0xCA | RATING REGION TABLE(RRT) | 0x1FFB |
| 0xCB | EVENT INFORMATION TABLE(EIT) | per MGT |
| 0xCC | EXTENDED TEXT TABLE (ETT) | per MGT |
| 0xCD | SYSTEM TIME TABLE(STT) | 0x1FFB |

FIG. 11

| Syntax | No. of bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0; i<N; i++) { | | |
|       descriptor() | | |
|     } | | |
|   } | | |
|   reserved | 6 | '111111' |
|   additional_descriptors_length | 10 | uimsbf |
|   for(j=0; j<N; j++) { | | |
|     additional_descriptor() | | |
|   } | | |
|   CRC_32 | 32 | rpchof |
| } | | |

There are loops as many as ES

FIG. 12

| Syntax | No. of bits | Format |
|---|---|---|
| event_information_table_section() { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for(j=0; j<num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for(i=0; i<N; i++) { | | |
|             descriptor() | | |
|         } | | |
|     } | | |
|     CRC_32 | 32 | rpchof |
| } | | |

There are loops as many as ES

FIG. 14

| Syntax | No. of bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num_channels_in_section; i++) { | | |
|     shotr_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0; i<N; i++) { | | |
|       descriptor() | | |
|     } | | |
|   } | | |
|   reserved | 6 | '111111' |
|   additional_descriptors_length | 10 | uimsbf |
|   for(j=0; j<N; j++) { | | |
|     additional_descriptor() | | |
|   } | | |
|   CRC_32 | 32 | rpchof |
| } | | |

First entry (2D Service):
- short_name
- reserved
- major_channel_number → 3
- minor_channel_number → 1
- modulation_mode
- carrier_frequency
- channel_TSID
- program_number → 0x0001
- ETM_location
- access_controlled ➡ 2D Service
- hidden
- reserved
- hide_guide
- reserved
- service_type → 0x02
- source_id
- reserved
- descriptors_length
- for(i=0; i<N; i++) {
  - descriptor() → service_location_descriptor()
- }

Second entry (3D Hybridcast Service):
- short_name
- reserved
- major_channel_number → 3
- minor_channel_number → 2
- modulation_mode
- carrier_frequency
- channel_TSID
- program_number → 0x0002
- ETM_location
- access_controlled ➡ 3D Hybridcast Service
- hidden
- reserved
- hide_guide
- reserved
- service_type → 0x09
- source_id
- reserved
- descriptors_length
- for(i=0; i<N; i++) {
  - descriptor() → service_location_descriptor()
  -     service_cast_type_descriptor()
- }

FIG. 15

| Syntax | No. of bits | Format |
|---|---|---|
| service_cast_type_descriptor() { | | |
| descriptor_tag | 8 | uimsbf |
| descriptor_length | 8 | uimsbf |
| service_cast_type | 8 | uimsbf |
| } | | |

FIG. 16

| value | service_cast_type |
|---|---|
| 0x00 | RF_cast_only |
| 0x01 | Hybridcast |
| 0x02~0xFF | reserved |

FIG. 17

| value | hybrid_cast_net_type |
|---|---|
| 0x00 | Terrestrial |
| 0x01 | IP |
| 0x02 | Cable |
| 0x03 | Satellite |
| 0x04~0xOFF | Reserved |

FIG. 18

| value | hybrid_protocol_type |
|---|---|
| 0x00 | Transport via HTTP |
| 0x01 | Transport via NRT |
| 0x02~0xFF | Reserved |

FIG. 19

| value | hybrid_http_protocol_type |
|---|---|
| 0x00 | HTTP Live Streaming (IETF) |
| 0x01 | Dynamic Adaptive Streaming over HTTP (DASH) |
| 0x02 | HTTP Adaptive Streaming (OIPF) |
| 0x04~0xOFF | Reserved |

FIG. 20

| Syntax | No. of bits | Format |
|---|---|---|
| event_information_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num events in section; i++) { | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_text() | var | |
|     reserved | 4 | '1111' |
|     descriptors_length | 12 | |
|     for(i=0; i<N; i++) { | | |
|       descriptor() | | |
|     } | | |
|   } | | |
|   CRC_32 | 32 | rpchof |
| } | | |

First event:
- reserved
- event_id → 1
- start_time → 01:00:00 UTC, 6 January 2011
- reserved
- ETM_location
- length_in_seconds → 3600
- title_length
- title_text()
- reserved
- descriptors_length
- for(i=0; i<N; i++) {
  - descriptor()
    - contents_identification_descriptor() → Standard image-related info
    - hybrid_supplemental_contents_descriptor() → Additional image-related info
- }

Second event:
- reserved
- event_id → 2
- start_time → 02:00:00 UTC, 6 January 2011
- reserved
- ETM_location
- length_in_seconds → 3600
- title_length
- title_text()
- reserved
- descriptors_length
- for(i=0; i<N; i++) {
  - descriptor()
    - contents_identification_descriptor() → Standard image-related info
    - hybrid_supplemental_contents_descriptor() → Additional image-related info
- }

FIG. 21

| Syntax | No. of bits | Format |
|---|---|---|
| contents_identification_descriptor() { | | |
|     descriptor_tag | 8 | |
|     descriptor_length | 8 | uimsbf |
|     UCI() | var | uimsbf |
| } | | |

FIG. 22

| Syntax | No. of bits | Format |
|---|---|---|
| hybrid_supplemental_contents_descriptor() <br> { <br>     descriptor_tag <br>     descriptor_length <br>            Additional contents-related info. <br> } | <br><br>8<br>8 | <br><br>uimsbf<br>uimsbf |

FIG. 23
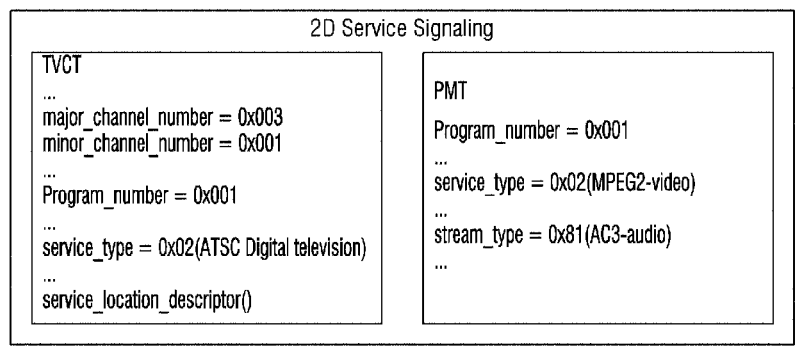
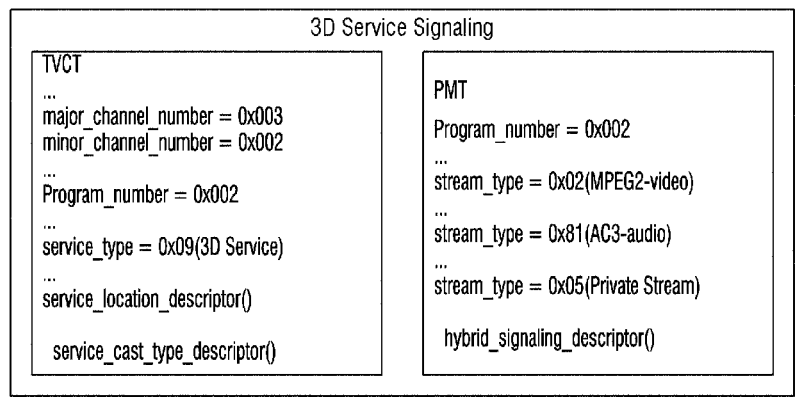

FIG. 25

| Syntax | No. of bits | Mnemonic |
|---|---|---|
| TS_program_map_section(){ | | |
| table_id | 8 | uimsbf |
| section_syntax_indicator | 1 | bslbf |
| '0' | 1 | bslbf |
| reserved | 2 | bslbf |
| section_length | 12 | uimsbf |
| program_number | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved | 3 | bslbf |
| PCR_PID | 13 | uimsbf |
| reserved | 4 | bslbf |
| program_info_length | 12 | uimsbf |
| for(i=0; i<N1; i++){ | | |
| descriptor() | | |
| } | | |
| for(i=0; i<N1; i++){ | | |
| stream_type | 8 | uimsbf |
| reserved | 3 | bslbf |
| elementary_PID | 14 | uimsbf |
| reserved | 4 | bslbf |
| ES_info_length | 12 | uimsbf |
| for(i=0; i<N2; i++){ | | |
| descriptor() | | |
| } | | |
| } | | |
| CRC_32 | 32 | rpchof |
| } | | |

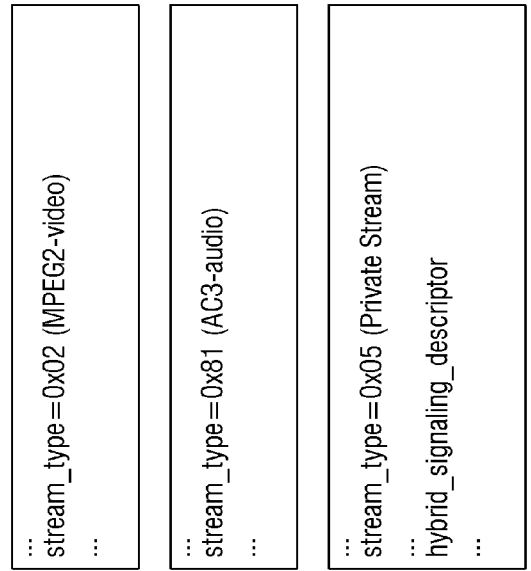

stream_type=0x02 (MPEG2-video)
… stream_type=0x81 (AC3-audio)
… stream_type=0x05 (Private Stream)
…
hybrid_signaling_descriptor
…

FIG. 26

| Syntax | No. of bits | Format |
|---|---|---|
| hybrid_signaling_descriptor() | | |
| { | | |
|    descriptor_tag | 8 | uimsbf |
|    descriptor_length | 8 | uimsbf |
|    reserved | 3 | uimsbf |
|    HCIT_version_number | 5 | uimsbf |
| } | | |

FIG. 27

| Syntax | No. of bits | Mnemonic |
|---|---|---|
| hybrid_3D_information_section() { | | |
|   table_id | 8 | uimsbf |
|   section_syntax_indicator | 1 | bslbf |
|   reserved | 3 | bslbf |
|   section_length | 12 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   start_time | 32 | uimsbf |
|   length_in_seconds | 20 | uimsbf |
|   for(i=0; i<N; i++) { | | |
|     descriptor() | | |
|   } | | |
|   num_of_supplemental_contents | | |
|   for(i=0; i<num_of_supplemental_contents; i++) { | | |
|     reserved | 4 | bslbf |
|     hybrid_net_cast_type | 8 | uimsbf |
|     if(hybrid_net_cast_type==0x00 \|\| 0x01) { | | |
|       hybrid_protocol_type | 12 | bslbf |
|     } | | |
|     supplemental_contents_play_start_time | 32 | uimsbf |
|     supplemental_contents_play_end_time | 32 | uimsbf |
|     reserved | | |
|     contents_copy_protection_indicator | 1 | bslbf |
|     contents_play_restriction_indicator | 1 | bslbf |
|     for(i=0; i<N1; j++) { | | |
|       descriptor() | | |
|     } | | |
|   } | | |
| } | | |
| CRC_32 | 32 | rpchof |

1st descriptor loop:
- contents_identification_descriptor()

2nd descriptor loop:
- contents_identification_descriptor()
- transport_protocol_descriptor()
- distribution_info_descriptor()
- contents_service_composition_descriptor()
- contents_property_descriptor()
- contents_protection_descriptor()

or

- contents_identification_descriptor()
- linkage_descriptor()
- distribution_info_descriptor()
- contents_service_composition_descriptor()
- contents_property_descriptor()
- contents_protection_descriptor()

FIG. 28

| Syntax | No. of bits | Format |
|---|---|---|
| distribution_info_descriptor() | | |
| { | | |
|    descriptor_tag | 8 | uimsbf |
|    descriptor_length | 8 | uimsbf |
|    supplemental_contents_distribution_start_time | 32 | uimsbf |
|    supplemental_contents_distribution_start_time | 32 | uimsbf |
| } | | |

FIG. 29

| Syntax | No. of bits | Format |
|---|---|---|
| linkage_descriptor() { | | |
|    descriptor_tag | 8 | uimsbf |
|    descriptor_length | 8 | uimsbf |
|    linkage_transport_stream_id | 16 | uimsbf |
|    linkage_original_network_id | 16 | uimsbf |
|    linkage_service_id | 16 | uimsbf |
| } | | |

FIG. 30

| Syntax | No. of bits | Format |
|---|---|---|
| contents_protection_descriptor() { | | |
|     descriptor_tag | 8 | uimsbf |
|     descriptor_length | 8 | uimsbf |
|     reserved | 3 | uimsbf |
|     contents_copy_protection_indicator | 1 | uimsbf |
|     contents_plat_restriction_indicator | 1 | uimsbf |
| } | | |

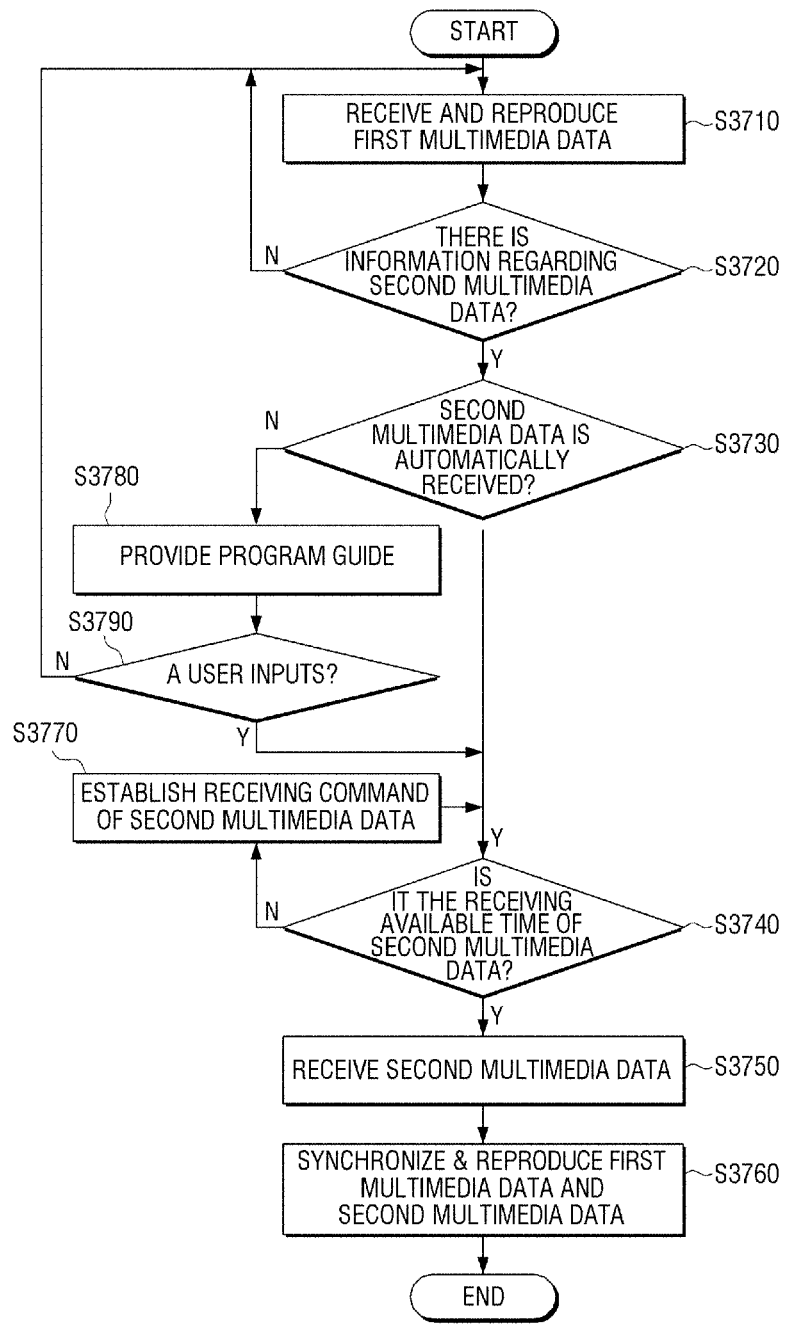

TRANSMITTING DEVICE, RECEIVING DEVICE, AND TRANSCEIVING METHOD THEREOF

CROSS-REFERENCE TO RELATED APPLICATION

This application is a National Stage of International Application No. PCT/KR2012/006458, filed on Aug. 13, 2012, and claims priority from U.S. Provisional Application No. 61/522,854 filed on Aug. 12, 2011, U.S. Provisional Application No. 61/522,881 filed on Aug. 12, 2011, U.S. Provisional Application No. 61/545,283 filed on Oct. 10, 2011, and Korean Patent Application No 10-2012-0088496 filed on Aug. 13, 2012, the disclosures of which are incorporated herein by reference in their entirety.

BACKGROUND

1. Field

Methods and apparatuses consistent with the exemplary embodiments relate to a transmitting device, a receiving device, and a transreceiving method thereof, and more specifically, to a transmitting device configured to provide a plurality of streams, a receiving device configured to receive and process a plurality of streams, and a transreceiving method thereof.

2. Description of the Related Art

As electronic technologies have developed, various types of electronic apparatuses have also been developed. Particularly, televisions (TVs) can provide three-dimensional (3D) contents or more advanced contents than previous TVs. Thus, in the broadcasting technologies, new technology is developing in order to provide contents including a plurality of images such as 3D contents, multi angle contents, and contents including depth images, or contents having ultra high definition (UHD) level of screen quality.

While channel bandwidths used in the related broadcasting networks are limited, multi angle contents, 3D contents and UHD screen quality of contents store greater data size compared to the related contents. Thus, the related broadcasting networks maybe limited in transmitting contents having greater data size.

Further, because the cost should be greatly considered to invest new infrastructures to provide new contents, new contents should be provided by using the related broadcasting infrastructures and receiving apparatuses. Therefore, multimedia data which become a standard among a plurality of multimedia data included in multimedia content, may be transmitted through the related broadcasting networks, and additional multimedia data may be transmitted through different transmission paths from the related broadcasting networks.

However, if data are respectively transmitted through different transmission paths, each multimedia data may use independent encoders, and system clocks of the encoders are not uniform. Thus, it may be difficult to add uniform synchronization information.

Further, it is also difficult to decide which method is used to provide signaling information regarding multimedia data transmitted through different transmission paths from the existing broadcasting networks.

Also, when additional multimedia data are transmitted through IP networks as a different transmission path from the existing broadcasting networks, packet loss or packet delay may occur compared to multimedia data transmitted through the related broadcasting networks in view of IP network characteristics.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an exemplary embodiment, there is provided a transmitting device which provides a plurality of streams, a receiving device which receives and processes a plurality of streams, and a transreceiving method thereof.

According to another aspect of the exemplary embodiments, there is provided a method which synchronizes multimedia data when a plurality of streams are provided through different transmission paths, and an effective signaling method with regard to multimedia data transmitted through different transmission paths from the existing broadcasting networks.

Further, another aspect of the exemplary embodiments provides a method which can effectively compensate loss or delay of packets during transmission in IP networks.

According to an exemplary embodiment, the transmitting device includes a data generator configured to generate first transmission data comprising first multimedia data constituting multimedia contents, first synchronization information for synchronizing second multimedia data constituting the first multimedia data, first signaling data regarding the first multimedia data and second signaling data regarding the second multimedia data, and second transmission data comprising the second multimedia data and second synchronization information for synchronizing the first multimedia data, a first transmitter configured to transmit the first transmission data provided from the data generator to the receiving device through broadcasting network, and a second transmitter configured to transmit the second transmission data provided from the data generator to the receiving device through an IP network.

Herein, the first signaling data may include at least one from among reproducing time information of the first multimedia data and identifier information of the first multimedia data, and the second signaling data may include at least one from among reproducing time information of the second multimedia data, receiving time information of the second multimedia data, receiving path information of the second multimedia data, identifier information of the second multimedia data, service composition information of the second multimedia data, features information of the second multimedia data, and protection information of the second multimedia data.

Further, the first signaling data may be recorded on at least one from among program and system information protocol (PSIP) and program specific information (PSI) of the first transmission data, and the second signaling data may be recorded on at least one from among program and system information protocol (PSIP) and a private stream of the first transmission data.

Further, the second transmitter may divide the second transmission data into a plurality of segments, generate information regarding a preset number of segments, and transmits the second transmission data on a segment basis according to the information regarding the segments.

Further, the data generator may include a plurality of time code generators configured to generate time codes synchronized with each other as first and second synchronization information, and add the generated time codes to the first and the second multimedia data, a plurality of encoders configured to encode the first and the second multimedia data which are added with the time codes, a signaling data generator configured to generate the first signaling data and the second signaling data, and a multiplexer configured to generate the first transmission data by multiplexing the encoded first multimedia data, the first signaling data and the second signaling data.

According to an exemplary embodiment, the receiving device includes a first receiver configured to receive first transmission data comprising first multimedia data, first synchronization information, first signaling data regarding the first multimedia data and second signaling data regarding second multimedia data through broadcasting network, a second receiver configured to receive second transmission data comprising the second multimedia data and second synchronization information through an IP network, a signaling data extractor configured to extract the first signaling data and the second signaling data from the first transmission data, a signal processor configured to signal-process the first multimedia data and the second multimedia data by using the extracted first signaling data and second signaling data, and a synchronizer configured to construct multimedia contents by synchronizing the signal-processed first multimedia data and second multimedia data based on the first synchronization information and the second synchronization information.

Herein, the second receiver may receive information regarding segments of the second transmission data by using information comprised in the second signaling data, and the second transmission data on a segment basis by using the received information regarding the segments.

Further, the first synchronization information may include time codes added to image frames respectively in the first multimedia data, and the second synchronization information may include time codes added to image frames respectively in the second multimedia data.

According to an exemplary embodiment, the transmitting method of the transmitting device may include generating first transmission data comprising first multimedia data constituting multimedia contents, first synchronization information for synchronizing second multimedia data constituting the multimedia contents, first signaling data regarding the first multimedia data, and second signaling data regarding the second multimedia data, generating second transmission data comprising the second multimedia data and second synchronization information for synchronizing with the first multimedia data, transmitting the generated first transmission data through broadcasting network, and transmitting the generated second transmission data through IP network.

Further, the first signaling data may be recorded on at least one from among program and system information protocol (PSIP) and program specific information (PSI) of the first transmission data, and the second signaling data may be recorded on at least one from among program and system information protocol (PSIP) and a private stream of the first transmission data.

Further, the transmitting the second transmission data may include dividing the second transmission data into a plurality of segments, generating information regarding a preset number of segments, and transmitting the second transmission data on a segment basis according to the information regarding the segments.

Further, the generating the first transmission data may include generating time codes as first synchronization information and adding to the first multimedia data, encoding the first multimedia data added with the time codes, generating the first signaling data and the second signaling data, and generating the first transmission data by multiplexing the encoded first multimedia data, the first signaling data and the second signaling data. The generating the second transmission data may include generating time codes uniform with the time codes added to the first multimedia data as second synchronization information and adding the generated time codes to the second multimedia data, and encoding the second multimedia data added with the time codes.

According to an exemplary embodiment, the receiving method of the receiving device comprises receiving first transmission data comprising first multimedia data, first synchronization information, first signaling data regarding the first multimedia data and second signaling data regarding second multimedia data through a broadcasting network, receiving second transmission data comprising the second multimedia data and second synchronization information through IP network, extracting the first signaling data and the second signaling data from the first transmission data, signal-processing the first multimedia data and the second multimedia data by using the extracted first signaling data and second signaling data, and constituting multimedia contents by synchronizing the first multimedia data and the second multimedia data based on the first synchronization information and the second synchronization information.

Herein, the receiving the second transmission data may include receiving information regarding segments of the second transmission data by using information comprised in the second signaling data, and receiving the second transmission data on a segment basis by using the received information regarding the segments.

Further, the first synchronization information may include time codes added to image frames respectively in the first multimedia data, and the second synchronization information may include time codes added to image frames respectively in the second multimedia data.

According to the above various exemplary embodiments, new contents can be provided to a user, overcoming limitations in the transmission bandwidths by transreceiving different data through different transmission paths with the existing broadcasting devices.

Further, when a plurality of streams are provided through different transmission paths to each other, each multimedia data can be effectively synchronized so that synchronized reproducing can be performed among a plurality of multimedia data.

Further, signaling can be effectively performed on multimedia data transmitted through different transmission paths from the related broadcasting networks, and packet loss or delay regarding multimedia data transmitted through IP network can be compensated.

BRIEF DESCRIPTION OF THE DRAWINGS

The above and/or other aspects will be more apparent by describing certain exemplary embodiments with reference to the accompanying drawings, in which:

FIG. 4 illustrates an example of Ancillary data format including time code;

FIG. 6 is a view provided to explain area where time code is recorded according to MPEG-2 compression method;

FIG. 7 is a view provided to explain area where time code is recorded according to H.264 compression method;

FIG. 8 is a view provided to explain PMT of PSI;

FIGS. 9 and 10 are views provided to explain tables of PSIP;

FIG. 11 is a view provided to explain VCT of PSIP;

FIG. 12 is a view provided to explain EIT of PSIP;

FIG. 14 illustrates constitution of VCT including the related unified network service and the heterogenous network service;

FIGS. 15 and 16 are views provided to explain service_cast_type_descriptor( );

FIG. 17 is a view provided to explain types of hybrid_cast_net_type;

FIG. 18 illustrates an example of hybrid_protocol_type;

FIG. 19 illustrates an example of hybrid_http_protocol_type;

FIG. 20 illustrates an example of EIT constitution regarding heterogenous network service channels;

FIG. 21 illustrates an example of content_identification_descriptor( ) in FIG. 20;

FIG. 22 illustrates an example of hybrid_supplemental_content_descriptor( ) in FIG. 20;

FIG. 23 illustrates an example regarding TVCT and PMT constitutions on the unified network service and the heterogenous network service;

FIG. 25 illustrates an example of providing hybrid_signaling_descriptor( ) through PMT;

FIG. 26 illustrates an example of hybrid_signaling_descriptor( );

FIG. 27 illustrates an example of HCIT;

FIG. 28 illustrates an example of distribution_info_descriptor( );

FIG. 29 illustrates an example of linkage descriptor( );

FIG. 30 illustrates an example of content_protection_descriptor( );

FIG. 37 is a flowchart provided to explain a receiving method of a receiving device according to another exemplary embodiment.

DETAILED DESCRIPTION OF EXEMPLARY EMBODIMENTS

Figure 1:
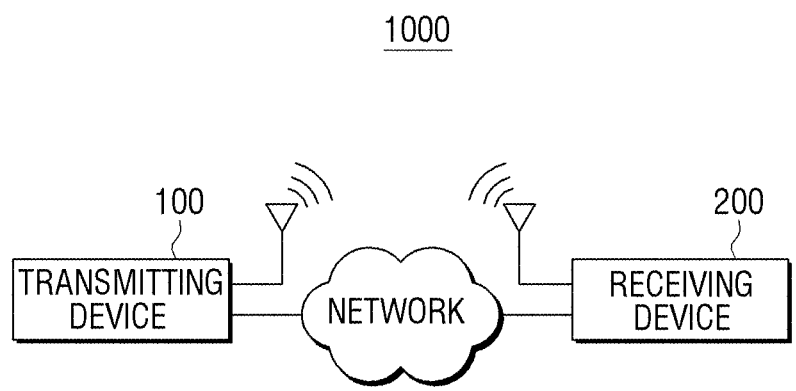
FIG. 1 illustrates a transreceiving system of multimedia data according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the exemplary embodiments with unnecessary detail.

FIG. 1 illustrates a multimedia data transreceiving system according to an exemplary embodiment. Referring to FIG. 1, the multimedia data transreceiving system 1000 includes a transmitting device 100 and a receiving device 200.

The transmitting device 100 processes multimedia data and transmits different signals through different transmission networks. For example, as illustrated in FIG. 1, the transmitting device 100 may transmit first signals through a first transmission network and second signals through a second transmission network.

The first and the second signals may be different multimedia data which constitute a single content, or a combination of a relatively low quality of multimedia data and a relatively high quality of multimedia data. For example, when the multimedia data is 3D contents, one of the left-eye and the right-eye images may be transmitted through the first transmission network, and the other one may be transmitted through the second transmission network. For another example, full high definition (FHD) screen quality of the first signals may be transmitted through the first transmission network, and ultra high definition (UHD) screen quality of the second signals may be transmitted through the second transmission network. Additionally, the first and the second signals may be multimedia data constituting multi angle contents, 2D images and depth images.

Herein, the first transmission network may be a radio frequency (RF) network (or broadcasting network), and the second transmission path may be an IP network (or internet network). However, this is merely one of the exemplary embodiments. Accordingly, the first transmission network may be an IP network and the second transmission network may be an RF network, or the first and the second transmission networks may be a uniform format of networks.

The receiving device 200 may perform signal-processing regarding the multimedia data by receiving the first and the second signals transmitted from the transmitting device 100, and synchronize the signal-processed multimedia data and reproduce the contents.

Figure 2:
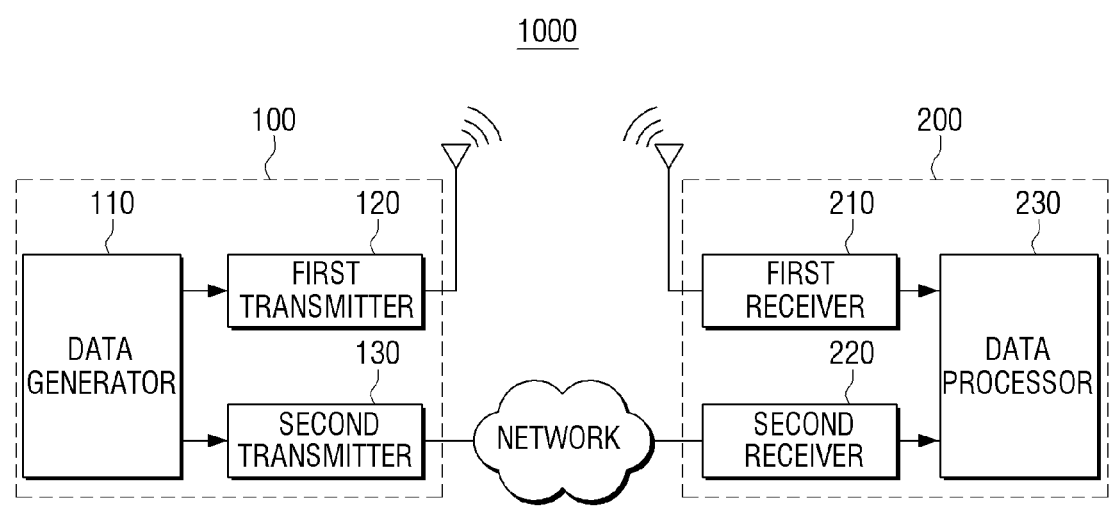
FIG. 2 is a block diagram of a multimedia data transreceiving system according to an exemplary embodiment.

FIG. 2 is a block diagram of the multimedia data transreceiving system according to an exemplary embodiment. Referring to FIG. 2, the transmitting device 100 of the multimedia data transreceiving system 1000 includes a data generator 110, a first transmitter 120, and a second transmitter 130.

The data generator 110 processes multimedia data and transmits the multimedia data to the first transmitter 120 and the second transmitter 130. Specifically, the data generator 110 generates first transmission data and second transmission data by processing the multimedia data, and transmits the generated first and second transmission data respectively to the first transmitter 120 and the second transmitter 130.

Herein, the first transmission data may include first multimedia data constituting first multimedia contents, first synchronization information to synchronize the first multimedia data with second multimedia data constituting second multimedia contents, first signaling data regarding the first multimedia data, and second signaling data regarding the second multimedia data, and the second transmission data may include the second multimedia data and second synchronization information to synchronize the second multimedia data with the first multimedia data.

The first transmitter 120 transmits the first transmission data to the receiving device 200 through the first transmission network. For the above process, the first transmitter 120 may modify the first transmission data into a format suitable for the transmission standard of the first transmission network, and transmit the first transmission data to the receiving device 200.

The second transmitter 130 transmits the second transmission data to the receiving device 200 through the second transmission network. For the above process, the second transmitter 130 may modify the second transmission data into a format suitable for the transmission standard of the second transmission network.

The receiving device 200 of the multimedia data transreceiving system includes a first receiver 210, a second receiver 220, and a data processor 230.

The first receiver 210 receives the first transmission data through the first transmission network from the transmitting device 100. The second receiver 220 receives the second transmission data through the second transmission network from the transmitting device 100. For example, the first receiver 210 may receive the first transmission data through a broadcasting network, and the second receiver 220 may receive the second transmission data through an IP network.

The data processor 230 constructs the multimedia data by processing the first transmission data and the second transmission data. Specifically, the data processor 230 may signal-process the first multimedia data and the second multimedia data by using the first signaling data and the second signaling data included in the received first transmission data and the received second transmission data, synchronize the signal-processed first multimedia data and second multimedia data, and construct the multimedia contents.

Figure 3:
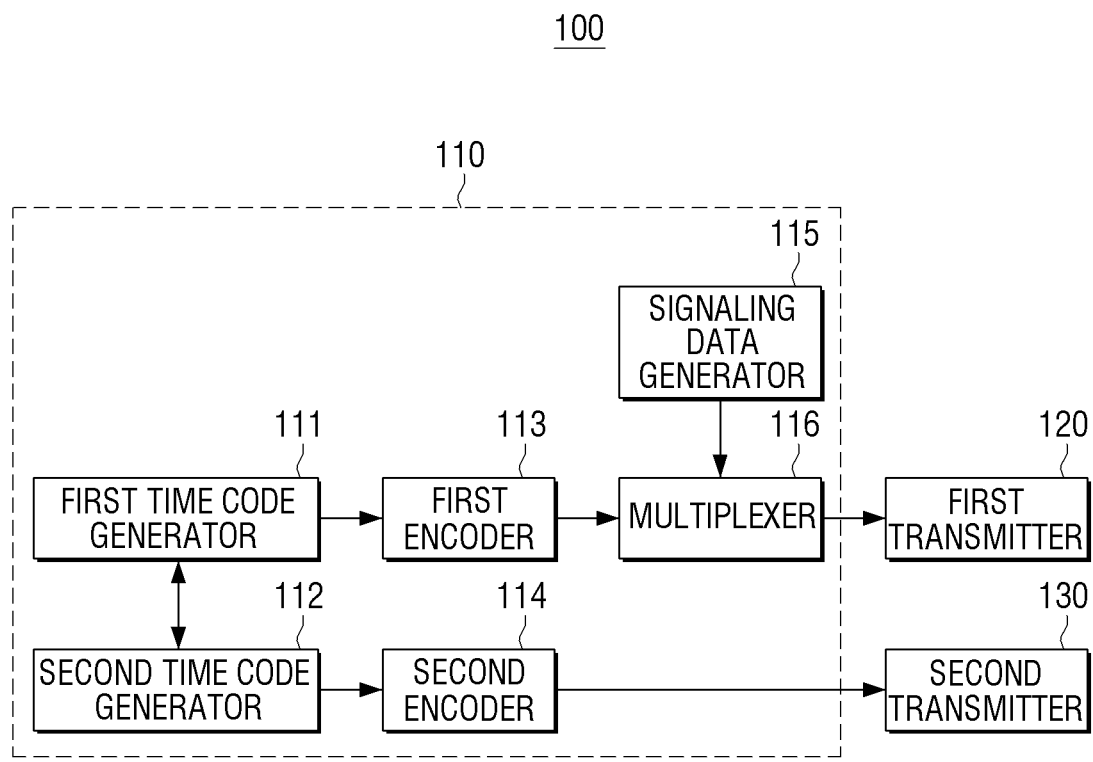
FIG. 3 is a block diagram of a transmitting device 100 according to an exemplary embodiment.

FIG. 3 is a block diagram of the transmitting device 100 according to an exemplary embodiment. Referring to FIG. 3, the transmitting device 100 includes a first time code generator 111, a second time code generator 112, a first encoder 113, a second encoder 114, a signaling data generator 115, a multiplexer 116, the first transmitter 120, and the second transmitter 130.

The first time code generator 111 generates time codes and adds the generated time codes to the first multimedia data. Specifically, the first time code generator 111 may generate time codes according to Society of Motion Picture and Television Engineers (SMPTE) 12M standard, and add the time codes to the first multimedia data.

The second time code generator 112 generates time codes and adds the generated time codes to the second multimedia data. The second time code generator 112 may generate time codes according to SMPTE 12M standard, and add the time codes to the second multimedia data.

SMPTE 12M time code is a standard enacted in order to perform labeling on a frame basis regarding each video data in SMPTE. Time codes may be inserted into film, video data, and audio data, and are used for editing or synchronizing. Generally, the time code may be synchronized when generating or editing contents and the data having the same reproducing time bandwidth may have the same time code.

FIG. 4 illustrates an example of Ancillary data format including time codes. Referring to FIG. 4, information regarding the time code may be defined in 'units of frames', 'units of seconds', 'units of minutes', and 'units of hours'. The time code generated in the process of generating or editing contents may be delivered to the encoder through HD-SDI (Serial Digital Interface) defined in SMPTE. Specifically, the time code may be delivered to the encoder according to Ancillary data format defined in SMPTE 291M.

However, in certain circumstances the time code may not be included in the contents, or the time code information may not be uniform with each other between multimedia data to be synchronized and reproduced. In this case, the time code synchronized within the transmitting device should be delivered to the encoder. Therefore, the above described first time code generator 111 and second time code generator 112 may generate and add the time codes to multimedia data. Since it is necessary that the same time code is added to a plurality of multimedia data to be synchronized, a plurality of time code generators 111, 112 may externally receive the standard for generating the time code in Sync Signal Reference format, and each time code generator may generate the same time code by sharing the Sync Signal Reference with each other and add the time code to the multimedia data.

Figure 5:
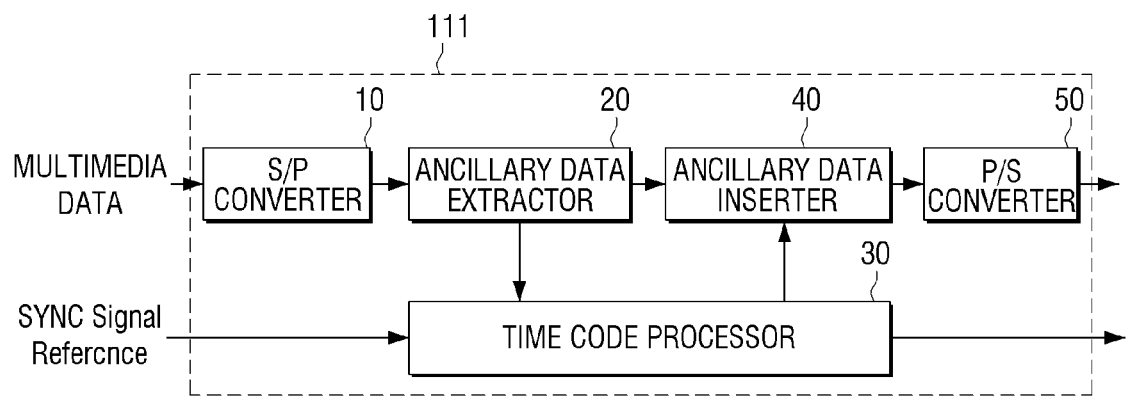
FIG. 5 is a detailed block diagram of a first time code generator according to an exemplary embodiment.

FIG. 5 is a detailed block diagram of the first time code generator according to an exemplary embodiment. The first time code generator 111 may include a serial to parallel (S/P) converter 10, Ancillary data extractor 20, a time code processor 30, an Ancillary data inserter 40, and a parallel to serial (P/S) converter 50.

The S/P converter 10 converts the HD-SDI multimedia data inputted in series into signals in parallel.

The Ancillary data extractor 20 extracts Ancillary data area from the multimedia data which are converted into the signals in parallel and outputs the Ancillary data to the time code processor 30.

The time code processor 30 inputs information regarding the time code in the inputted Ancillary data area. Specifically, the time code processor 30 may input or modify information regarding the time code by using Sync Signal Reference inputted externally.

The Ancillary data inserter 40 inserts Ancillary data with the information regarding the time code inputted therein, to the multimedia data.

The P/S converter 50 converts the multimedia data inputted in parallel back to data in series and outputs the data to the first encoder 113, according to the HD-SDI standard.

Although FIG. 5 depicts only the first time code generator, the second time code generator 112 may be implemented in a similar manner as the first time code generator. Further, as described above, each time code generator may generate the same time code values by sharing Sync Signal Reference with each other and add the same to the multimedia data.

Further, although FIG. 3 illustrates that the transmitting device 100 includes the two time code generators 111, 112, the transmitting device 100 may include more than two time code generators according to the number of multimedia data to be processed or the number of encoders included in the transmitting device 100.

The first encoder 113 receives the first multimedia data added with the time code and performs encoding. Specifically, the first encoder 113 may perform MPEG-2 encoding for compatibility with the existing receiving devices. However, the image format that can be encoded in the first encoder 113 may not be so limited. Encoding may be performed according to image formats that can be currently used such as H.264 and HEVC and various image formats that can be applied to the exemplary embodiments.

The second encoder 114 receives the second multimedia data added with the time code and performs encoding. Specifically, the second encoder 114 may perform encoding according to the H.264 compression method regarding the second multimedia data. However, the image format that can be encoded in the second encoder 114 may not be so limited. Encoding may be performed according to image formats that can be currently used such as MPEG-2 and HEVC and various image formats that can be applied to the exemplary embodiments.

The time codes included in the multimedia data may be recorded with different recording methods according to the compression methods of the encoders, the details of which will be explained below by referring to FIGS. 6 and 7.

FIG. 6 is a view provided to explain an area where the time code is recorded according to the MPEG-2 compression method. Referring to FIG. 6, the time code may be recorded by using a predefined time_code field which is recorded within the group of pictures (GOP) header on a GOP basis.

FIG. 7 is a view provided to explain the area where the time code is recorded according to the H.264 compression method. Referring to FIG. 7, the time code may be recorded by using seconds_value, minute_value, hours_value, and n_frames defined in Picture timing supplemental enhancement information (SEI).

The signaling data generator 115 generates the first signaling data regarding the first multimedia data and the second signaling data regarding the second multimedia data.

Herein, the first signaling data may include at least one from among reproducing time information of the first multimedia data and identifier information of the first multimedia data. The second signaling data may include at least one from among reproducing time information of the second multimedia data, receiving time information of the second multimedia data, receiving path information of the second multimedia data, identifier information of the second multimedia data, service composition information of the second multimedia data, features information of the second multimedia data, and protection information of the second multimedia data.

The reproducing time information of the first multimedia data indicates time when the first multimedia data is reproduced, and may be expressed in the form of start and end times of reproducing or start time of reproducing and reproducing length. The reproducing time information of the first multimedia data may be used as sync information of the second multimedia data (for example, when there is second multimedia data including the reproducing time information uniform with the first multimedia data, the first multimedia data and the second multimedia data may be used as information indicating that they are related to single contents).

The identifier information of the first multimedia data may be unique values of the contents that can distinguish the first multimedia data and include the same identifier with the second multimedia data. Thus, the identifier information of the first multimedia data may be used as a standard to synchronize the first multimedia data and the second multimedia data.

The reproducing time information of the second multimedia data indicates reproducing time of the second multimedia data, and may be expressed with reproducing start and end times or reproducing start time and reproducing length. As described above, the reproducing time information of the second multimedia data may be used as sync information of the first multimedia data.

The receiving time information of the second multimedia data is information indicating the time when the second multimedia can be received, and may be expressed with start and end times when receiving the second multimedia data can be available.

The receiving path information of the second multimedia data is information indicating transmission paths where the second multimedia data can be received. The receiving path information may provide information regarding the transmission paths by distinguishing a case in which the second multimedia data is provided through the RF network, from a case in which the second multimedia data is provided through the IP network. Further, the receiving path information of the second multimedia data may include information related with protocols by which the second multimedia can be received.

The identifier information of the second multimedia data are unique values of the contents that can distinguish the second multimedia data, and may include the same identifier as the first multimedia data. Thus, the identifier information may be used as a standard to synchronize the first multimedia data and the second multimedia data.

The service composition information of the second multimedia data is information indicating a service format of the second multimedia data which is synchronized with the first multimedia data and reproduced as one contents. The service composition information may indicate service format such as stereoscopic, multi-angle image, additional audio, scripts, or data.

The feature information of the second multimedia data is information related with the features regarding the second multimedia data, and may include information regarding data format, codec, resolution, or data size.

The protection information of the second multimedia data is information to protect the second multimedia data, and may include conditional access information, play limitation information or copy protection information.

The first signaling data may be recorded on at least one from among program and system information protocol (PSIP) and program specific information (PSI) regarding the broadcasting signals. The second signaling data may be recorded on at least one from among PSIP and private stream regarding the broadcasting signals. Further details will be specifically explained below by referring to FIGS. 8 to 31.

FIG. 8 illustrates a program map table (PMT) of PSI. PSI may be constituted with a Program Association Table (PAT) and PMT. PAT provides relations between service streams and packet identification (PID) values on PMT sections having program definitions for the service streams, and PMT provides program definitions by connecting program numbers with one elementary stream class. For example, regarding a program constituted with one MPEG-2 video and one AC-3 audio, two ES loop constitutions are obtained and Stream_types are defined respectively as 0x02 and 0x81.

Figure 10:
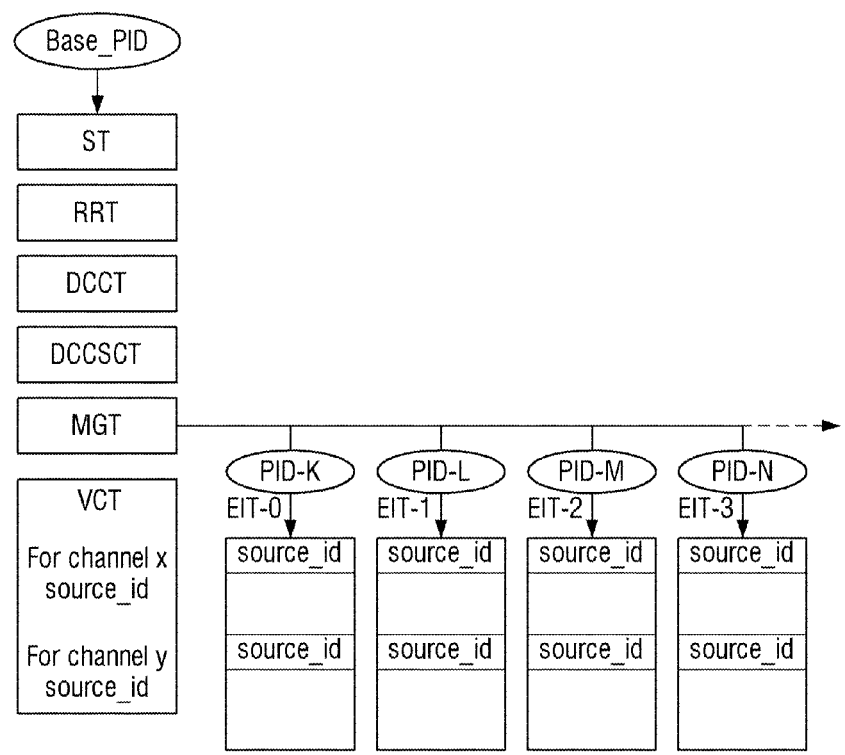

FIGS. 9 and 10 illustrate tables of PSIP. PSIP describes all the programs in ATSC standard, system information tables, descriptors, and their related data structures. As illustrated in FIG. 9, PSIP may include tables such as MGT, TVCT, CVCT, RRT, EIT, ETT, and STT, and the relationships between the tables can be ascertained by referring to FIG. 10.

FIG. 11 illustrates the virtual channel table (VCT) of PSIP. VCT (TVCT, CVCT) lists information regarding virtual channels transmitted within the transmission stream among PSIP information. Thus, VCT (TVCT, CVCT) includes loops related with corresponding channel information to the number of virtual channels within one transmission stream which is divided with TSID (transport_stream_id), and types of services provided respectively by the virtual channels are defined by service_type. For example, the existing 2D broadcasting system has 0x02 of service_type which indicates ATSC_digital_television.

FIG. 12 is a view provided to explain the event information table (EIT) of PSIP. EIT includes information regarding events of the virtual channels (titles and start times). Herein, one event may indicate one TV program. 128 EIT may be transmitted at a maximum in the format of EIT-k (k=0, 1 . . . 127). Each EIT-k may have a multiple instances, and each instance may have information regarding one virtual channel which is distinguished with a combination of table_id and source_id. PSIP should transmit at least 4 (EIT-0, 1, 2, 3) of broadcasting guide information and may have 128 EIT (3 hours×128=16) at maximum. For example, each EIT may provide event information by 3 hours on specific time such as 0 hour, 3 hours, 6 hours, 9 hours, 12 hours, 15 hours, 18 hours, and 21 hours.

One EIT may provide a plurality of events and may include a plurality of loops divided with event_id according to the number of events. Herein, event having the time interval exceeding one EIT is described in each EIT so as to have the same event_id. For example, event starting at 17:30 UTC and continuing at 19:30 UTC may be included in the two EITs (EIT from 15:00 to 18:00 and EIT from 18:00 to 21:00) with the same event_id. Event_id may have the single value within corresponding EITs.

Figure 13:
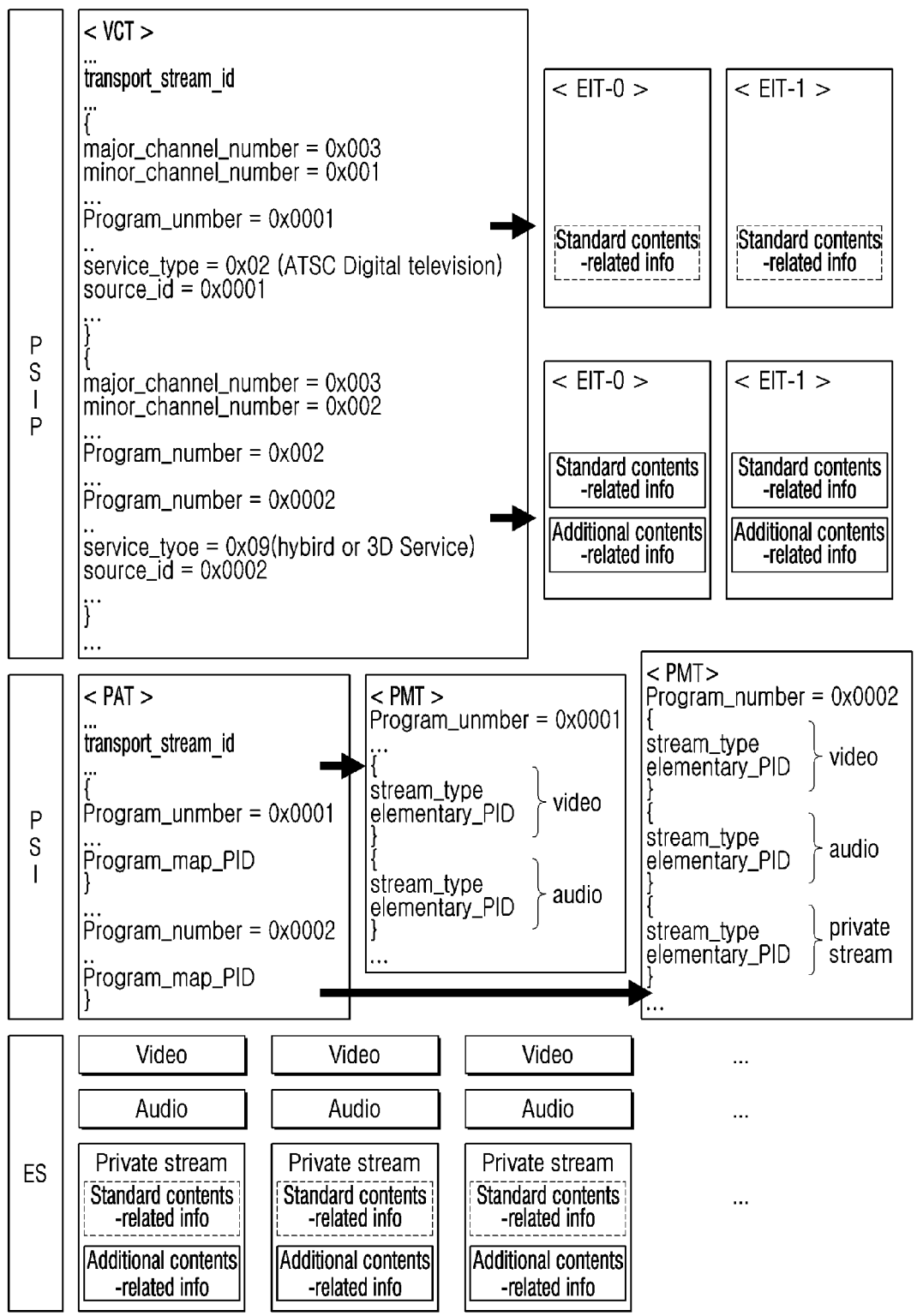
FIG. 13 is a view provided to explain signaling through PSIP and PSI, and ES structure.

FIG. 13 illustrates signaling through PSIP and PSI and ES structure. Signaling regarding contents on ATSC based systems may be provided through PSIP and PSI. VCT (virtual channel table) of PSIP indicates virtual channels in which the heterogenous network service is provided, and EIT (event information table) indicates information related with the second multimedia data which is synchronized with the first multimedia data provided from a corresponding channel. On DVD based systems, PSIP information provided from ATSC is expressed with SI structure, and VCT information may be applied to NIT or SDT while EIT may be applied through the same EIT.

Further, similar information to the information provided from PSIP may be also provided through PSI. However, if it is considered that PSI provides structure information based on the currently provided contents, it may not proper to express the signaling data of the second multimedia data that may not be provided based on the current contents on PSI. Therefore, information regarding the second multimedia data may be desirably provided through a separate private stream (for example, stream_type=0x05 or other reserved stream_type).

The following will specifically explain a signaling method regarding each of PSIP, PSI and private stream on the heterogenous network based contents providing service.

Signaling through PSIP

On the heterogenous network-based contents providing service, transmission networks to provide standard images (or the first multimedia data) are divided from transmission networks to provide additional images (or the second multimedia data). In this service, the existing receiving device that does not provide the heterogenous network service should only use the standard images in order to uniformly use the existing services (lower compatibility). Thus, when the standard images are provided through RF network and the additional images are provided through the heterogenous IP network, the existing receiving device should provide 2D viewing by only analyzing contents of RF network which provides the standard images. Further, a receiving device that can provide the heterogenous network service should obtain information regarding the additional images through the RF network in which the standard images are provided, and further obtain the additional images to constitute the dimensional images from the heterogenous IP network through corresponding information. Thus, the signaling data can be simultaneously provided in two formats. Specifically, within VCT, it may express the existing service having the lower compatibility, service_type=0x02 (ATSC_digital_television) and new service using 0x07 (parameterized service) or reserved service_type.

Herein, new service expressed to be 0x07 or reserved value of service_type may be defined by any one of hybrid service indicating the heterogenous network service or 3D service indicating the dimensional image service which includes the heterogenous network transmission format according to its definition. When corresponding service_type is 3D_service, it should additionally define new service_cast_type_descriptor( ) that can distinguish the unified network service (RF_cast_only) and the heterogenous network service (Hybridcast) in order to command whether to use the heterogenous network.

FIG. 14 illustrates VCT constitution including all of the existing unified network service and the heterogenous network service. Constitution format of dimensional image digital broadcasting TVCT based on the heterogenous network may be expressed with the example of FIG. 14. FIG. 14 assumes that service_type=0x09 indicates 3D_service, and illustrates that service_cast_type of service_cast_type_descriptor( ) which describes a 3D providing method is defined with 0x01 value indicating the heterogenous network and the additional images are provided through the heterogenous network.

FIGS. 15 and 16 illustrate service_cast_type_descriptor( ). In values of service_cast_type defining the heterogenous network service in FIG. 15 are described in FIG. 16. Thus, service_type applied to VCT may inform the service format by selectively using one of the two methods, i.e., hybrid service and service_type. RF_cast_only defined to be 0x00 in FIG. 16 indicates that the standard/additional images are provided through the existing RF network, and Hybridcast defined to be 0x01 indicates that the standard images are provided through the RF network and the additional images are provided through the heterogenous network.

As described above, it may simultaneously provide the normal 2D digital television (DTV) service and the heterogenous network based service having the lower compatibility or the heterogenous network based 3D service with VCT. Further, program based contents indicated to be an event is provided through corresponding service channel. The features of the event may be specifically described with EIT indicating event based information. Herein, the signaling data to describe a plurality of the heterogenous network based contents may be additionally provided through EIT corresponding to the heterogenous network service.

Specifically, because the reproducing time information of the first multimedia data is defined in EIT to be start_time and length_in_seconds, additional definition is unnecessary. However, according to various cases, it may be used as sync information with the second multimedia data.

The identifier information of the first multimedia data, e.g., universal and ubiquitous contents identifier (UCI) has the single value in each content, and thus, it may be used as an identifier for synchronizing the first multimedia data and the second multimedia data. Further, because resolution and format information are included in UCI when UCI is used, the contents features information may be provided through UCI.

The reproducing time information of the second multimedia data may be defined to be supplemental_content_start_time, supplemental_content_play_end_time or supplemental_content_length_in_seconds, and may be used as sync information with the first multimedia data. supplemental_content_play_start_time indicates a start time of reproducing additional contents, supplemental_content_ play_end_time indicates an end time of reproducing the second multimedia data, and supplemental_content_length_ in_seconds indicates reproducing length of the second multimedia data.

The receiving time information of the second multimedia data may be defined to be supplemental_content_distribution_start_time indicating a start time when the second multimedia data can be received or supplemental_content_distribution_end_time indicating an end time when receiving the second multimedia data can be finished.

The transmission path information of the second multimedia data may be defined with various methods such as grounded wave, IP network, cable and satellite, and also through hybrid_cast_net_type.

FIG. 17 illustrates types of hybrid_cast_net_type. When hybrid_cast_net_type is defined to be 0x00 or 0x01 in FIG. 17, path and protocol information regarding the second multimedia data may be provided through hybrid_protocol_type, hybrid_http_protocol_type, and selector_byte. When hybrid_cast_net_type is defined to be 0x02 or 0x03, transmission paths of the second multimedia data may be provided through linkage_transport_stream_id, linkage_original_network_id, and linkage_service_id.

FIG. 18 illustrates an example of hybrid_protocol_type, hybrid_protocol_type describes protocol types related with an obtaining method of the second multimedia data.

FIG. 19 illustrates an example of hybrid_http_protocol_type. When hybrid_protocol_type is defined to be 0x000 (transport via HTTP), hybrid_http_protocol_type may specifically inform types of HTTP protocol.

When hybrid_protocol_type is defined to be 0x000 (transport via HTTP), hybrid_http_receive_type informs whether to receive streaming based on HTTP protocol or downloading based on HTTP protocol.

selector_byte expresses information regarding transmission paths which the second multimedia data can be received. Further, URL information providing methods may be different according to protocols for receiving the second multimedia data (e.g., HTTP based protocol and NRT based protocol). For example, HTTP based protocol may be provided in a format of 'http://www.hybrid.co.kr/' and NRT based protocol may be provided in a format of 'nrt://{atsc_tsId}.{subnet_id}.{nrt_service_id}/{nrt_content_linkage}[/{file name}]'.

Meanwhile, linkage_transport_stream_id indicates TSID which the second multimedia data is provided, linkage_original_network_id indicates a unique network id which the second multimedia data is provided, and linkage_service_id indicates a service_id which the additional data is provided.

The identifier information of the second multimedia data may be used as a standard to synchronize the second multimedia data with the first multimedia data by providing unique values of the contents that can distinguish the second multimedia data. For example, universal and ubiquitous contents identifier (UCI) can be used as an identifier to synchronize the first multimedia data and the second multimedia data because it has the single value according to each content. Further, when UCI is used, because resolution and format information are included in UCI, content features information may be provided together through UCI.

The service composition information of the second multimedia data is information indicating a service type of the second multimedia data which are synchronized with the first multimedia data and reproduced into a single content. It may be indicated in service types such as stereoscopic, multi-angle image, additional audio, script, or data.

The features information of the second multimedia data is information related with the features of the second multimedia data, and may provide information related with the features of the second multimedia data such as data format, codec, resolution, data size, and contents providing type (e.g., L or R image indication of the second multimedia data and whether the second multimedia data is to be used as 2D contents regarding 3D content).

The protection information of the second multimedia data is information to protect the second multimedia data and may include conditional access information, play limitation information, and copy protection information. Specifically, the protection information of the second multimedia data may be defined to be a content_copy_protection_indicator or a content_play_restriction_indicator. content_copy_protection_indicator may limit the received additional contents to be externally copied, and content_play_restriction_indicator may limit that reproducing cannot be performed before the reproducing time defined in the reproducing time information of the second multimedia data regarding the received additional contents.

FIG. 20 illustrates an example of EIT constitution regarding the heterogenous network service channels. Referring to FIG. 20, the signaling information of the first multimedia data (the identifier information of the first multimedia data) and the signaling information of the second multimedia data (the reproducing time information of the second multimedia data, the receiving time information of the second multimedia data, the receiving path information of the second multimedia data, the identifier information of the second multimedia data, the service composition information of the second multimedia data, the features information of the second multimedia data, and the protection information of the second multimedia data) may be provided respectively through content_identification_descriptor( ) and hybrid_supplemental_content_descriptor( ).

FIG. 21 illustrates an example of content_identification_descriptor( ) in FIG. 20. Referring to FIG. 21, UCI is provided for an example of the unique value to distinguish the contents.

FIG. 22 illustrates an example of hybrid_supplemental_content_descriptor( ) in FIG. 20. Referring to FIG. 22, the signaling information of the second multimedia data (or the signaling data) may be included in 'additional image related information' area of hybrid_supplemental_content_descriptor( ).

Signaling through PSI

FIG. 23 illustrates examples regarding constitutions of TVCT and PMT in the unified network service and the heterogenous network service. When PSIP signaling is defined as shown in the format of FIG. 13, corresponding transmission stream may include two program constitutions (ch9-1:service_type=0x02, program_number=0x01 (unified or 2D service) and ch9-2:service_type=0x09, program_number=0x2 (heterogenous or 3D service)), and the two programs may be connected based on the standards of the two PMTs and program_number. The two programs include standard images and audio information in common, and the heterogenous network 3D service additionally includes information regarding the private stream including the signaling data regarding the additional image. Although FIG. 23 illustrates that the private stream is defined to be 0x05, it may be defined to be 0x06.

Figure 24:
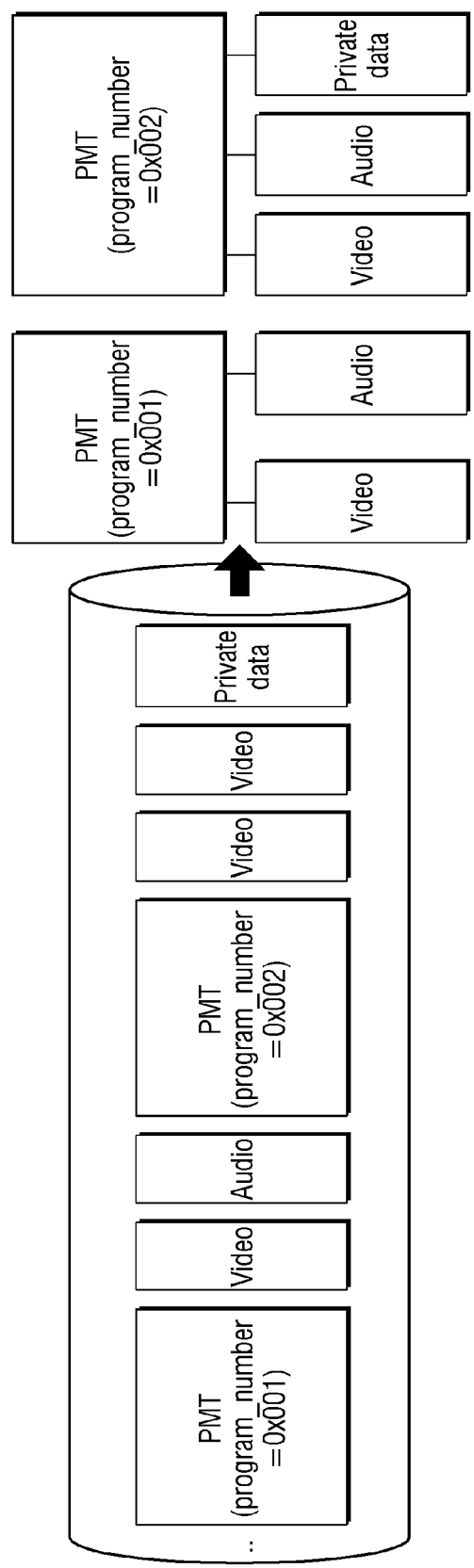
FIG. 24 illustrates a format of providing MPEG-2 stream including the unified network service and the heterogenous network service.

FIG. 24 illustrates a format of providing an MPEG-2 stream including the unified network service and the heterogenous network service. Video, audio, and private data provided on the transmission stream may respectively include a PMT constitution per unified network service and heterogenous network service. As described above, PMT (program_number=0x002) indicating the heterogenous network service should provide additional image related information transmitted through the heterogenous network by using the private data. To indicate the providing of the additional image related information, whether there is additional image related information transmitted through the heterogenous network may be informed with a hybrid_signaling_descriptor( ) within the private data ES loop of PMT.

FIG. 25 illustrates an example of providing a hybrid_signaling_descriptor( ) through PMT. When hybrid_signaling_descriptor( ) is provided on PMT, it may be recognized that the additional image related information is provided in the private stream format. Although FIG. 25 illustrates that the private stream is defined to be 0x05, it may be defined to be 0x06.

FIG. 26 illustrates an example of a hybrid_signaling_descriptor( ). A HCIT_version_number field provided within the descriptor in FIG. 26 is provided through the private stream, and indicates a version of HCIT table including the additional image related information. When the value of HCIT_version_number is modified, it indicates that descriptions provided from the table are updated.

Signaling through Private Stream

As described above, the signaling information regarding the second multimedia data transmitted through the heterogenous network from PMT of PSI may be provided as a private stream. The following will define the signaling information regarding the additional images provided within the private stream, and explain that the signaling information can be specifically expressed through a new table such as a hybrid cast information table (HCIT). The signaling information regarding the second multimedia data that can be provided on the private stream may include the reproducing time information of the second multimedia data, the receiving time information of the second multimedia data, the receiving path information of the second multimedia data, the identifier information of the second multimedia data, the service composition information of the second multimedia data, the features information of the second multimedia data, and the protection information of the second multimedia data. The signaling information regarding the first multimedia data may be provided together with the signaling information of the second multimedia data through the private stream.

The reproducing time information of the first multimedia data may be defined with start_time and end_time or length_in_seconds, and may be used as sync information with the second multimedia data. Herein, start_time indicates start time of reproducing the first multimedia data, end_time indicates end time of reproducing the first multimedia data, and length_in_seconds indicates reproducing length of the second multimedia data.

The identifier information of the first multimedia data may be used as a standard to synchronize the first multimedia data and the second multimedia data by providing unique values of the contents that can distinguish the first multimedia data from the second multimedia data. For example, UCI has a single value according to each content, and thus, may be used as an identifier to synchronize the first multimedia data and the second multimedia data. Further, because resolution and format information are included in UCI when UCI is used, the contents features information may be provided together through UCI.

The reproducing time information of the second multimedia data indicates reproducing time when the second multimedia data is reproduced, and may be defined to be supplemental_content_start_time, supplemental_content_play_end_time or supplemental_content_length_in_seconds. Further, the reproducing time information may be used as sync information with the first multimedia data. supplemental_content_play_start_time indicates start time of reproducing the additional contents, supplemental_content_play_end_time indicates end time of reproducing the second multimedia data, and supplemental_content_length_in_seconds indicates the reproducing length of the second multimedia data.

The receiving time information of the second multimedia data may be defined to be supplemental_content_distribution_start_time indicating the start time when the second multimedia data can be received and supplemental_content_distribution_end_time indicating the end time when receiving the second multimedia data can be finished.

The receiving path information of the second multimedia data may be defined with various methods such as grounded wave, IP network, cable and satellite, and also through hybrid_cast_net_type. Similar to FIG. 18 described above, when hybrid_cast_net_type is defined to be 0x00 or 0x01, path and protocol information of the second multimedia data may be provided through hybrid_protocol_type, hybrid_http_protocol_type, and selector_byte. When hybrid_cast_net_type is defined to be 0x02 or 0x03, transmission paths of the second multimedia data may be provided through linkage_transport_stream_id, linkage_original_network_id, or linkage_service_id.

Hybrid_protocol_type describes protocol types related with the obtaining method of the second multimedia data. When hybrid_http_protocol_type is defined to be 0x000 (transport via HTTP), it specifically exemplifies types of HTTP protocols. When hybrid_protocol_type is defined to be 0x000 (transport via HTTP), hybrid_http_receive_type indicates whether to receive HTTP protocol based streaming or HTTP protocol based downloading.

selector_byte expresses transmission path information that the second multimedia data can be received, and there are differences in URL information providing methods according to protocols for receiving the second multimedia data (e.g., HTTP based protocol and NRT based protocol). For example, HTTP based protocol may be provided in the format of 'http://www.hybrid.co.kr/' and NRT based protocol may be provided in the format of 'nrt://{atsc_tsId}.{subnet_id}.{nrt_service_id}/{nrt_content_linkage}[/{file name}]'.

Meanwhile, linkage_transport_stream_id indicates the TSID which the second multimedia data is provided, linkage_orginal_network_id indicates a unique network id which the second multimedia data is provided, and linkage_service_id indicates service_id which the additional contents is provided.

The identifier information of the second multimedia data may be used as a standard to synchronize the second multimedia data and the first multimedia data by providing unique values of the contents that can distinguish the second multimedia data. For example, because UCI has a single value according to each contents, it may be used as an identifier to synchronize the first multimedia data and the second multimedia data. Further, because resolution and format information are included in UCI when UCI is used, the contents features information may be provided together through UCI.

The service composition information of the second multimedia data is information indicating service formats of the second multimedia data which is synchronized with the first multimedia data and reproduced into a single content. The service composition information may be indicated in service formats such as stereoscopic, multi-angle image, additional audio, scripts, or data.

The features information of the second multimedia data is information related with the features of the second multimedia data, and may provide information related with the features of the second multimedia data such as data format, codec, resolution, data size, and contents providing type (e.g., Left or Right image indication of the second multimedia data and whether the second multimedia data is to be used as 2D contents regarding 3D content).

The protection information of the second multimedia data is information to protect the second multimedia data, and may include conditional access information, play limitation information and copy protection information. Specifically, the protection information of the second multimedia data may be defined to be content_copy_protection_indicator or content_play_restriction_indicator. content_copy_protection_indicator may limit the received additional contents to be externally copied, and content_play_restriction_indicator may limit that the received additional contents cannot be reproduced before the reproducing time defined in the reproducing time information of the second multimedia data.

Based on the above explanations of the signaling data, the following will specifically describe constitution format of the digital broadcasting hybrid cast information table (HCIT) based on the heterogenous network.

FIG. 27 illustrates an example of HCIT. Each field or descriptor of FIG. 27 includes the above described signaling information.

Specifically, the reproducing time information of the first multimedia data may be provided through start_time or length_in_seconds of HCIT.

The identifier information of the first multimedia data, for example, UCI may be provided through content_identification_descriptor( ) of the 1st descriptor loop within HCIT.

The reproducing time information of the second multimedia data may be provided through supplemental_content_start_time or supplemental_content_length_in_seconds field of HCIT.

The receiving time information of the second multimedia data will be explained by referring to FIG. 28. FIG. 28 illustrates an example of distribution_info_descriptor( ). Referring to FIG. 28, values of supplemental_content_distribution_start_time and supplemental_content_distribution_end_time may be provided by using distribution_info_descriptor( ) newly defined in the $2^{nd}$ descriptor loop of HCIT.

The receiving path information of the second multimedia data may be provided by describing network types which the second multimedia data is provided through the hybrid_net_cast_type field of HCIT.

When hybrid_net_cast_type of HCIT is 0x00 (grounded wave) or 0x01 (IP network), the receiving path information of the second multimedia data may be provided by using transport_protocol_descriptor( ) defined in the standard of the related grounded wave open type hybrid TV (OHTV: terrestrial open hybrid TV) in the $2^{nd}$ descriptor loop, and information of hybrid_http_protocol_type and hybrid_http_receive_type may be provided by expanding the reserved field of transport_protocol_descriptor( ).

FIG. 29 illustrates an example of linkage descriptor( ). When hybrid_net_cast_type of HCIT is 0x02 (cable) or 0x03 (satellite), the receiving path information of the second multimedia data may be provided with linkage descriptor( ) including information of linkage_transport_stream_id, linkage_original_network_id and linkage_service_id on the $2^{nd}$ descriptor loop.

The identifier information of the second multimedia data, for example, UCI may be provided through content_identification_descriptor( ) of the $2^{nd}$ descriptor loop within HCIT.

The service composition information of the second multimedia data may be provided through content_service_composition_descriptor( ) of the $2^{nd}$ descriptor loop within HCIT.

The features information of the second multimedia data may be provided through content_property_descriptor( ) of the $2^{nd}$ descriptor loop within HCIT.

The protection information of the second multimedia data will be explained by referring to FIG. 30. FIG. 30 illustrates an example of content_protection_descriptor( ). Referring to FIG. 30, information of content_copy_protection_indicator and content_play_restriction_indicator may be provided through content_protection_descriptor( ) of the $2^{nd}$ descriptor loop within HCIT.

The multiplexer 116 multiplexes the first multimedia data, the first signaling data and the second signaling data, and generates the first transmission data. Specifically, the multiplexer 116 may generate the first transmission data by receiving and multiplexing the first multimedia data to which synchronization information is added and encoded, the first signaling data and the second signaling data generated in the signaling data generator 115.

The first transmitter 120 transmits the first transmission data generated in the multiplexer 116 to the receiving device 200. The first transmitter 120 may additionally process the first transmission data so as to be suitable for the transmission network and transmit the first transmission data to the receiving device 200. For example, when a first transmission network is a RF network, the first transmitter 120 may include a demodulator (not illustrated) and an up-converter (not illustrated), and may perform demodulating and up-converting in order to transmit RF signals.

The second transmitter 130 transmits the second multimedia data encoded in the second encoder 114 to the receiving device 200. The second transmitter 130 may additionally process the second transmission data so that the second transmission data is suitable for the transmission network, and transmit the second transmission data to the receiving device 200. For example, when a second transmission network is an IP network, the second transmission data may be converted into an IP stream format and transmitted to the receiving device 200.

Further, the second transmitter 130 may transmit the second transmission data to the receiving device 200 on a segment basis. For this process, the second transmitter 130 may divide the second transmission data into a plurality of segments, generate information regarding a preset number of segments, and transmit the second transmission data to the receiving device 200.

When the second multimedia data is transmitted through the second transmission network, the second transmitter 130 may transmit the data in real-time or in non-real-time. Thus, the receiving device 200 may receive the second multimedia data as a real-time steam to correspond to the receiving time of the first multimedia data (i.e., the airing time of the multimedia content). Additionally, the receiving device 200 may receive and store the second multimedia data before the airing time of the second multimedia data, and reproduce the contents by using the prestored second multimedia data when the first multimedia data is received.

Live broadcasting multimedia contents cannot be received at non-real-time. Even if the second multimedia data can be received at non-real-time, the receiving device 200 should previously receive and store the second multimedia data. Thus, maintaining separate storing space for the second multimedia data may be problematic. Further, by providing the second multimedia data to the receiver before the airing time of the multimedia contents, the second multimedia contents may be leaked before the actual airing time of the contents. Therefore, it may be necessary to transmit the second multimedia data at real-time.

When the second multimedia data is provided at real-time, more specifically, when the second multimedia data is provided through the IP network, packet loss or packet delay may occur. If packet loss of the second multimedia data provided through the IP network at real-time occurs, users may have fatigue because screens delivered to the viewers may not be normally provided with regard to 3D contents. Therefore, the second transmitter may provide the second transmission data by applying TCP based protocol rather than User Datagram Protocol (UDP) based protocol which may have packet loss. Specifically, among TCP based protocols, HTTP based streaming methods having an objective to transmit at real-time may be applied. HTTP based streaming may apply HTTP live streaming (HLS), MPEG dynamic adaptive streaming over HTTP (DASH), Open IPTV Forum (OIPF) HTTP adaptive streaming (HAS), and MS smooth streaming.

Figure 31:
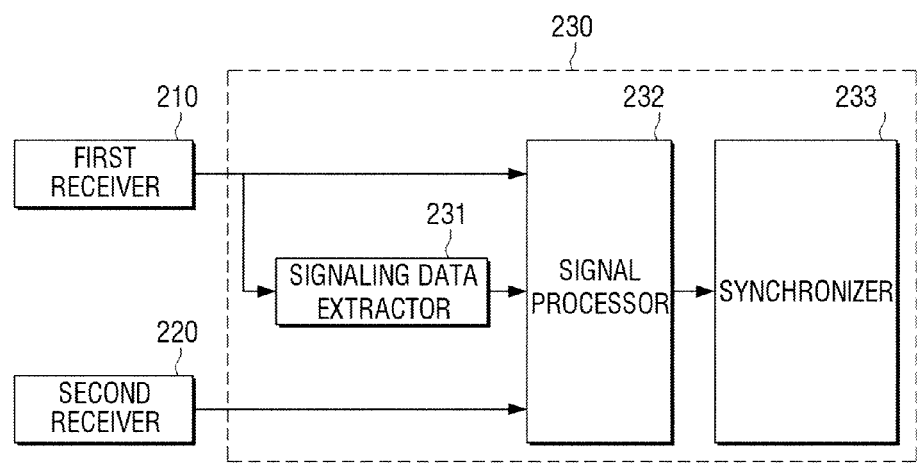
FIG. 31 is a block diagram of a receiving device according to an exemplary embodiment.

FIG. 31 is a block diagram of the receiving device according to an exemplary embodiment. Referring to FIG. 31, the receiving device 200 includes a first receiver 210, a second receiver 220, a signaling data extractor 231, a signal processor 232 and a synchronizer 233.

The first receiver 210 receives the first transmission data through the first network from the transmitting device 100. As described above, the first transmission data may include the first multimedia data, the first synchronization information, the first signaling data and the second signaling data.

The second receiver 220 receives the second transmission data through the second network from the transmitting device 100. As described above, the second transmission data may include the second multimedia data and the second synchronization information.

Herein, the second receiver 220 may receive information regarding segments of the second transmission data by using the information included in the second signaling data, and receive the second transmission data on a segment basis by using the information regarding the received segments.

Figure 32:
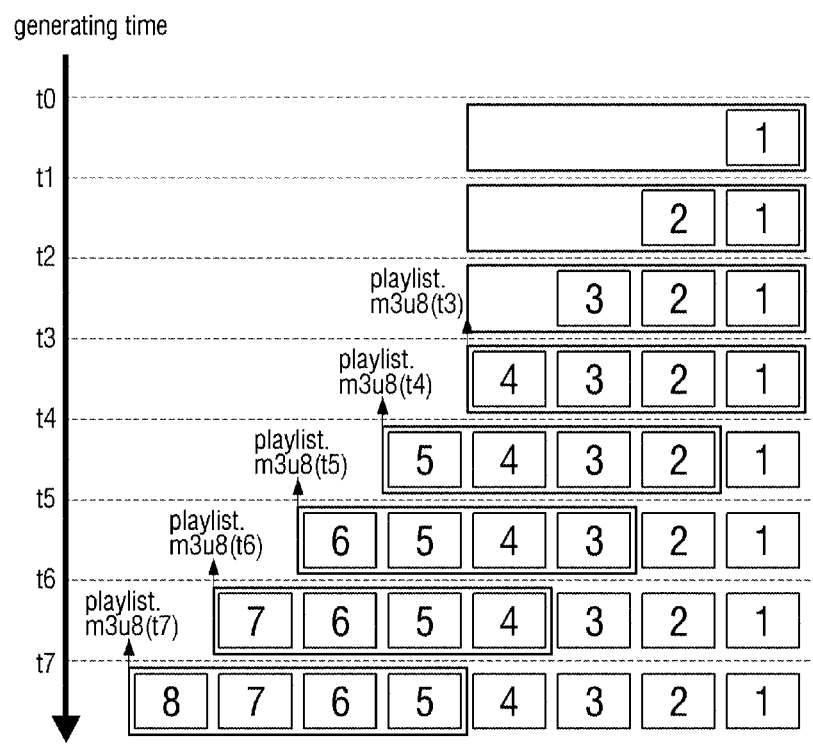
FIG. 32 is a view provided to explain a data transreceiving method according to HLS method as the time flows.

FIG. 32 illustrates a data transreceiving of an HLS method as the time flows. The transmitting device 100 divides the second transmission data on a segment basis, creates manifest files (metadata and MPD) including list information regarding each segment at real-time and updated by an external server. Herein, because it is difficult to include information of all the segments for which the manifest files are generated, the transmitting device 100 may continuously update information regarding segments corresponding to windows including a preset number of segments.

The receiving device 200 may previously receive the manifest files from an external server by using the above described second signaling data (specifically, the receiving path information of the second multimedia data), and may receive the second transmission data by requesting the second transmission data with the manifest files from the transmitting device 100. Specifically, the receiving device 200 may receive and reproduce the second transmission data generated in real-time by receiving the manifest files and requesting the second transmission data, and periodically requesting the segments based on the segment list information included in the manifest files.

When HTTP based streaming is applied to IP network transmission, the above described method may perform transmission without packet loss. However, delay may occur with regard to the multimedia data transmitted through the IP network compared to the multimedia data transmitted through the RF network. Thus, the receiving device 200 may include a personal video recorder (PVR) in order to delay and process the first transmission data provided through the RF network.

The receiver may store and delay the first transmission data transmitted through the RF network on a PVR according to the relative degree of delay of the second transmission data provided through the IP network. Thereafter, when the second transmission data is received through the IP network, the receiver may synchronize and reproduce the first multimedia data and the second multimedia data.

However, even when the relative delay of the IP network compared to the RF network can be compensated by using the PVR, when the delay time between the data provided through the RF network and the IP network increases, the following problem may occur. First, more than a certain level of buffering may be difficult if the storing amount is not sufficient as the delay time of the contents provided through the RF network increases and the buffering amount increases. Second, the reproducing time of the receiving device which receives and reproduces the second multimedia together with the first multimedia data may be delayed compared to the receiving device which only reproduces the first multimedia data received through the RF network. Specifically, the related receiving device, for which the heterogenous network service is not available, can reproduce the first multimedia data provided through the RF network without the delay. However, the receiving device, for which the heterogenous network is available, may reproduce the data relatively later compared to the related receiving device because the RF network contents should be delayed by a time corresponding to the delay of the IP network in order for the receiver to simultaneously use the contents provided through the RF network and the IP network.

Thus, it is desirable to minimize the delay degree of the IP network. For the minimization, the receiving device 200 may reproduce the most recently generated segment among a plurality of received segments on a window basis.

Specifically, the transmitting device 100 generates segments at real-time and continuously updates the segment lists included in the manifest files. Further, because the manifest files cannot include all of the segment lists which are generated at real-time, only the lists on a specific window basis can be continuously updated. Referring to FIG. 32, segments generated as the time flows and their m3u8 list formats on a window basis may be obtained. For example, if the window size is 4, the segments 1 to 5 are generated at 't5' time band, and the manifest file (playlist.m3u8(t4)) may include a list of the segments 2 to 5. The segments 1 to 6 are generated at 't6' time band, and the manifest file (playlist.m3u8(t5)) may include a list of the segments 3 to 6.

Herein, the receiving device may receive playlist.m3u8 file which is a manifest file, and determine the segment to be received by using the lists included in the received manifest file. When the receiving device 200 receives the 'playlist.m3u8(t4)' file including the segments 2 to 5, it may receive one segment among the lists included in the manifest file. Herein, if exemplifying a case that the segment 2 generated first is received, the segment 2 is segment which is generated from the longest in a corresponding playlist.m3u8(t4) list, and has the biggest delay difference with RF network. Thus, in order to minimize the delay time, it is desirable to receive the segment which is most newly generated. The receiving device 200 may receive the segment having the minimum delay difference with RF network by requesting the segment 5 among the segments 2 to 5.

However, as described above, when the most newly generated list is received among the lists included in the manifest file, if the IP network is unstable, the contents may not be seamlessly reproduced. For example, in FIG. 32, when the segment 5 is requested and received among the segment lists of the segments 2 to 5 included in 'playlist.m3u8(t4)' generated at a timing of 't5', the segment 6 should be continuously received in order to be reproduced seamlessly. Further, because the manifest file 'playlist.m3u8 (t5)' including information of the segment 6 is continuously reproduced while having the delay as much as the segment duration which is a time interval of generating a new segment, time lapse in receiving the segment 6 after receiving the segment 5 happen as much as a segment duration (e.g., if the segment has two seconds of duration, the second transmitter 130 generates new segment per two seconds, and updates the manifest file according to the generating). Further, the receiving device 200 should receive playlist.m3u8 (t5) file including information of corresponding segment immediately when the segment 6 is generated, request and receive the segment 6. Normally, as the transmission environment of the IP network is not preferable to support the above operation, when the delay occurs in the above processes and exceeds the reproducing time of the multimedia data included in one segment, the reproducing screen may have seam problems.

Therefore, the receiving device 200 may receive the most newly generated segment within a range that seamless reproducing can be performed, not the most newly generated segment within the lists included in the manifest file by considering the delay degree of the IP network.

The signaling data extractor 231 extracts the first signaling data and the second signaling data included in the first transmission data. As described above, the first signaling data may include at least one from among the reproducing time information of the first multimedia data and the identifier information of the first multimedia data, and the second signaling data may include at least one from among the reproducing time information of the second multimedia data, the receiving time information of the second multimedia data, the receiving path information of the second multimedia data, the identifier information of the second multimedia data, the service composition information of the second multimedia data, the features information of the second multimedia data, and the protection information of the second multimedia data.

The signal processor 232 may perform signal-processing of the first multimedia data and the second multimedia data based on the first signaling data and the second signaling data. Specifically, the signal processor 232 may include a first decoder (not illustrated) to decode the first multimedia data and a second decoder (not illustrated) to decode the second multimedia data. Each decoder may perform decoding of the multimedia data by performing the reverse processes of the first encoder 132 and the second encoder 134 in the transmitting device 100. Besides, the signal processor 232 may include a scaler (not illustrated) and a frame rate converter (not illustrated).

The synchronizer 233 constructs multimedia contents by synchronizing the first multimedia data and the second multimedia data which are signal-processed based on the first synchronization information and the second synchronization information. Specifically, the synchronizer 233 may synchronize the first multimedia data and the second multimedia data by using the time codes included in the first multimedia data and the second multimedia data as synchronization information.

FIG. 32 depicts that the synchronizer 233 performs synchronization of the signal-processed multimedia data after the processing by the signal processor 232. However, the synchronizer 233 may perform synchronization of the multimedia data which has not yet been signal-processed by signal processor 232. Further, the synchronizer 233 may be included in the signal processor 232 and may synchronize the multimedia data while the signal processor 232 is performing the signal-processing.

Figure 33:
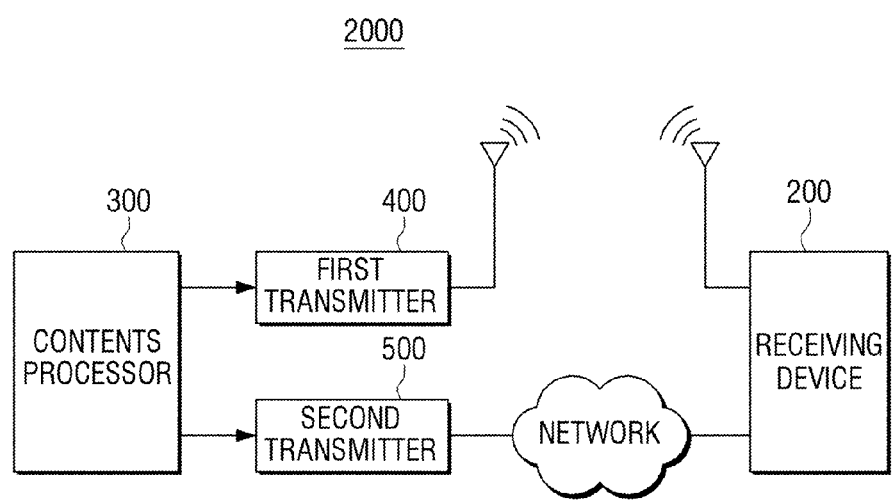
FIG. 33 illustrates the multimedia data transreceiving system according to another exemplary embodiment.

FIG. 33 illustrates the multimedia data transreceiving system according to another exemplary embodiment. The transreceiving system 2000 operates in the same manner as the transreceiving system 1000 of FIG. 2. However, the transceiver system 2000 may differ from the transceiver system 1000 in that the transmitting device 100 of the transreceiving system 1000 is implemented to be transmitting system including a plurality of devices. Referring to FIG. 33, the transreceiving system 2000 includes a contents processor 300, the first transmitter 400, the second transmitter 500 and the receiving device 200.

The contents processor 300 corresponds to the data generator 110 of the transmitting device 100, the first transmitter 400 corresponds to the first transmitter 120 of the transmitting device 100, and the second transmitter 500 corresponds to the second transmitter 130 of the transmitting device 100, which will not be further explained.

Figure 34:
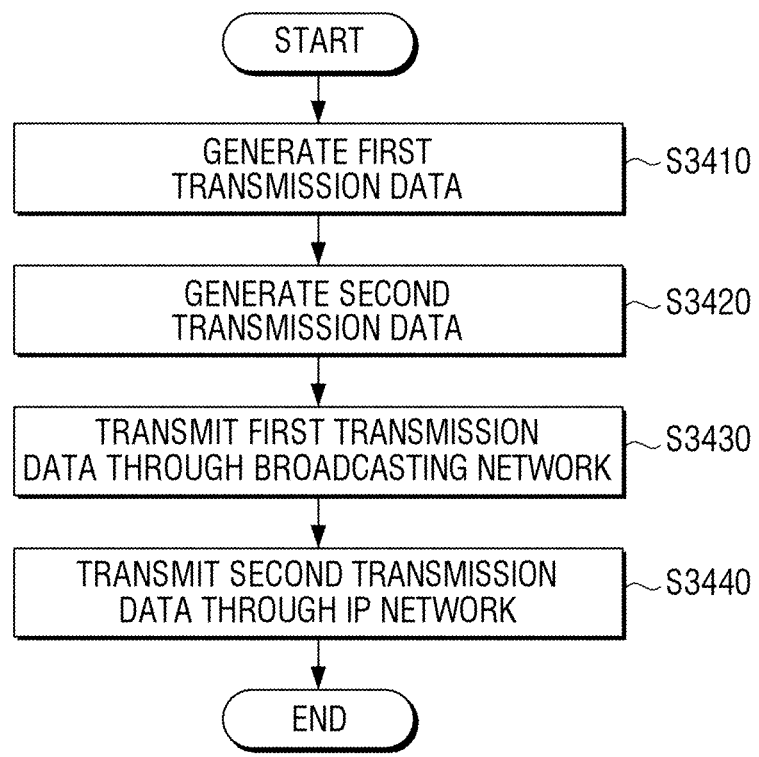
FIG. 34 is a flowchart provided to explain a transmitting method of a transmitting device according to an exemplary embodiment.

FIG. 34 is a flowchart which illustrates a transmitting method of the transmitting device according to an exemplary embodiment. Referring to FIG. 34, the first transmission data is generated at operation S3410. The first transmission data includes the first multimedia data constituting the multimedia contents, the first synchronization information, the first signaling data of the first multimedia data, and the second signaling data of the second multimedia data.

Specifically, the generating the first transmission data may include generating the time codes as first synchronization information and adding the time codes to the first multimedia data, encoding the first multimedia data added with the time codes, generating the first signaling data and the second signaling data, multiplexing the first multimedia data, the first signaling data and the second signaling data, and generating the first transmission data.

Herein, the first signaling data may include at least one from among the reproducing time information of the first multimedia data and the identifier information of the first multimedia data. The second signaling data may include at least one from among the reproducing time information of the second multimedia data, the receiving time information of the second multimedia data, the receiving path information of the second multimedia data, the identifier information of the second multimedia data, the service composition information of the second multimedia data, the features information of the second multimedia data and the protection information of the second multimedia data.

The first signaling data may be recorded on at least one from among PSIP and PSI of the first transmission data, and the second signaling data may be recorded on at least one from among PSIP of the first transmission data and the private stream.

At operation S3420, the second transmission data is generated. The second transmission data includes the second multimedia data constituting the multimedia data and the second synchronization information. The generating the second transmission data may include generating the time codes uniform to the time codes added with the first multimedia data and adding the time codes to the second multimedia data, and encoding the second multimedia data added with the time codes.

At operation S3430, the first transmission data is transmitted through the broadcasting network, and at operation S3440, the second transmission data is transmitted through the IP network. Herein, the transmitting the second transmission data may include dividing the second transmission data into a plurality of segments, generating information regarding a preset number of segments, and transmitting the second transmission data on a segment basis according to the information regarding the segments.

Figure 35:
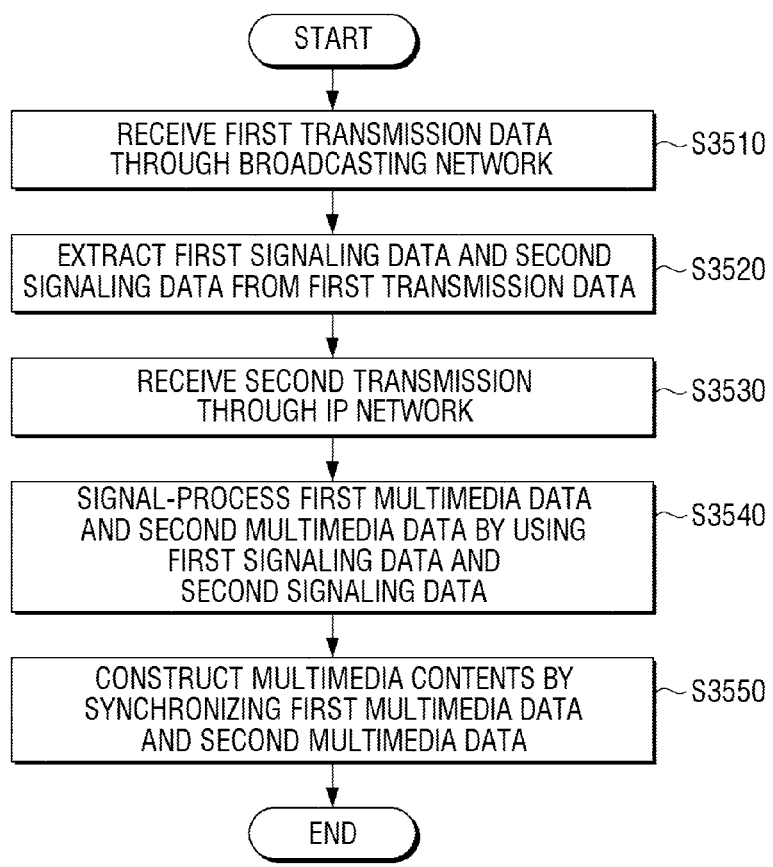
FIG. 35 is a flowchart provided to explain a receiving method of a receiving device according to an exemplary embodiment.

FIG. 35 is a view provided to explain a receiving method of the receiving device according to an exemplary embodiment. Referring to FIG. 35, the first transmission data is received through the broadcasting network at operation S3510. At operation S3520, the first signaling data and the second signaling data are extracted from the first transmission data. At operation S3530, the second transmission data is received through the IP network. Specifically, the information regarding the segments of the second transmission data may be received by using the information included in the second signaling data, and the second transmission data may be received on a segment basis by using the received information regarding the segments.

Further, at operation S3540, the first multimedia data and the second multimedia data are signal-processed by using the first signaling data and the second signaling data. At operation S3550, the first multimedia data and the second multimedia data are synchronized to construct the multimedia contents by using the first synchronization information and the second synchronization information. Herein, the first synchronization information is time code added with each image frame included in the first multimedia data, and the second synchronization information is time code added with each image frame included in the second multimedia data. Specifically, the time codes added with the first multimedia data and the second multimedia data may be extracted, and the first multimedia data and the second multimedia data may be synchronized by using the extracted time codes.

Figure 36:
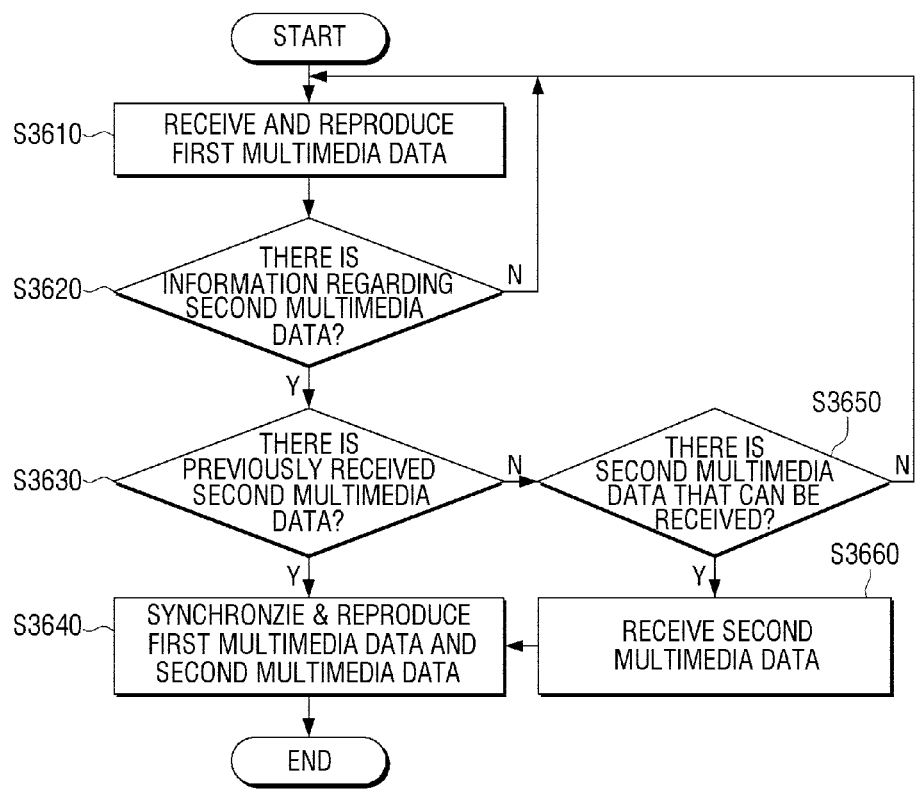
FIG. 36 is a flowchart provided to explain a receiving method of a receiving device according to another exemplary embodiment.

FIG. 36 is a flowchart provided to explain the receiving method of the receiving device according to another exemplary embodiment. Referring to FIG. 36, the receiving device 200 receives and reproduces the first multimedia data at operation S3610. At operation S3620, it is determined whether the information regarding the second multimedia data is included or not. Specifically, the receiving device 200 may determine whether the second signaling data is included within the first transmission data including the first multimedia data. When there is no information regarding the second multimedia data at operation S3620-N, the first multimedia data may only be received and reproduced. When there is information regarding the second multimedia data at operation S3620-Y, the receiving device 200 determines whether there is previously received second multimedia data at operation S3630.

When there is previously received second multimedia data at operation S3630-Y (e.g., the second multimedia data is received before the airing time through the IP network), the first multimedia data and the second multimedia data are synchronized and reproduced at operation S3640. For example, if the first multimedia data and the second multimedia data are left-eye images and right-eye images constituting 3D contents, 3D contents may be reproduced by combining the left-eye images and the right-eye images.

When there is no previously received second multimedia data at operation S3630-N (e.g., the multimedia contents is real-time broadcasting content), it is determined whether there is second multimedia data that can be received at operation S3650. Specifically, the receiving device 200 may determine whether there is second multimedia data that can be received by determining whether there is receiving transmission path information or receiving time information regarding the second multimedia data and whether a time is equal to the time information that receiving can be performed.

When there is no second multimedia data that can be received at operation S3650-N, only the first multimedia data may be received and reproduced at operation S3610. When there is second multimedia data that can be received at operation S3650-Y, the second multimedia data is received at operation S3660. At operation S3640, the first multimedia data and the second multimedia data are synchronized and reproduced.

FIG. 37 is a flowchart provided to explain the receiving method of the receiving method according to another exemplary embodiment. Referring to FIG. 37, the first multimedia data is received and reproduced at operation S3710. At operation S3720, it is determined whether there is information regarding the second multimedia data. Specifically, the receiving device 200 may determine whether there is second signaling data within the first transmission data including the first multimedia data. When there is no information regarding the second multimedia data at operation S3720-N, only the first multimedia data may be received and reproduced at operation S3710. When there is information regarding the second multimedia data at operation S3720-Y, it is determined whether the second multimedia data can be automatically received or not at operation S3730. Specifically, it is determined whether automatic receiving of the second multimedia data may be carried out, or whether passive receiving of the second multimedia data may be carried out.

When the second multimedia data is determined to be received automatically at operation S3730-Y, it is determined whether the time when the second multimedia data can be received has been reached at operation S3740. If the time when the second multimedia data can be received has been reached after confirming the time at operation S3740-Y, the second multimedia data is received at operation S3750, and the first multimedia data and the second multimedia data are synchronized and reproduced at operation S3760. For example, when the first multimedia data and the second multimedia data are left-eye images and right-eye images constituting 3D contents, 3D contents may be reproduced by combining the left-eye images and the right-eye images. When the time for receiving the second multimedia data has not been reached at operation S3740-N, a receiving command is established in order to receive the second multimedia data at the receiving available time at operation S3770. When the receiving available time of the second multimedia data has been reached at operation S3740, the second multimedia data is received according to the established command at operation S3750, and the first multimedia data and the second multimedia data are synchronized and reproduced at operation S3760.

When the second multimedia data is established to be received passively at operation S3730-N, a program guide is provided on the display screen so that the second multimedia data can be directly selected at operation S3780. At operation S3790, it is determined whether a user command is inputted. When a command to select the second multimedia data is inputted from a user at operation S3790-Y, it is determined whether the receiving available time of the selected second multimedia data has been reached at operation S3740. When a command to select the second multimedia data has not bee inputted from a user at operation S3790-N, only the first multimedia data is received and reproduced at operation S3710.

Programs to implement the methods according to the various exemplary embodiments may be stored and used in various types of recording medium.

Specifically, codes to perform the above described methods may be stored in various types of non-transitory computer readable recording medium such as flash memory, read only memory (ROM), erasable programmable ROM (EPROM), electronically erasable and programmable ROM (EEPROM), hard disc, removable disc, memory card, USB memory and CD-ROM.

The foregoing exemplary embodiments are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A transmitting device, comprising:
   at least one processor implementing a data generator configured to generate first transmission data comprising first multimedia data constituting first multimedia contents, first time code for synchronizing second multimedia data constituting second multimedia contents, first signaling data regarding the first multimedia data and second signaling data regarding the second multimedia data, and second transmission data comprising the second multimedia data and second time code for synchronizing the first multimedia data, the first time code time and the second time code being synchronized with each other;
   a first transmitter configured to transmit the first transmission data to a receiving device through a broadcasting network; and
   a second transmitter configured to transmit the second transmission data to the receiving device through an Internet Protocol (IP) network,
   wherein the data generator is further configured to add the first and second time codes to the first multimedia data and the second multimedia data, encode the first multimedia data and the second multimedia data which are added with the first and second time codes, and generate the first transmission data by multiplexing the encoded first multimedia data, the first signaling data and the second signaling data.

2. The transmitting device of claim 1, wherein the first signaling data comprises at least one of reproducing time information of the first multimedia data and identifier information of the first multimedia data, and the second signaling data comprises at least one of reproducing time information of the second multimedia data, receiving time information of the second multimedia data, receiving path information of the second multimedia data, identifier information of the second multimedia data, service composition information of the second multimedia data, features information of the second multimedia data, and protection information of the second multimedia data.

3. The transmitting device of claim 1, wherein the first signaling data is recorded on at least one of program and system information protocol (PSIP) and program specific information (PSI) of the first transmission data, and the second signaling data is recorded on at least one of program and system information protocol (PSIP) and a private stream of the first transmission data.

4. The transmitting device of claim 1, wherein the second transmitter divides the second transmission data into a plurality of segments, generates information regarding a preset number of the segments, and transmits the second transmission data on a segment basis according to the information regarding the preset number of segments.

5. A receiving device, comprising:
   a first receiver configured to receive first transmission data comprising first multimedia data, first time code for synchronizing second multimedia data, first signaling data regarding the first multimedia data and second signaling data regarding the second multimedia data through a broadcasting network, the received first transmission data being encoded with the first time code, the encoded first multimedia data being multiplexed with the first signaling data and the second signaling data;
   a second receiver configured to receive second transmission data comprising the second multimedia data and second time code for synchronizing the second multimedia data with the first multimedia data through IP network, the received second multimedia data being encoded with the second time code, the first time code and the second time code being synchronized with each other;
   a signaling data extractor configured to extract the first signaling data and the second signaling data from the first transmission data;
   a signal processor configured to signal-process the first multimedia data and the second multimedia data based on the extracted first signaling data and the extracted second signaling data; and
   a synchronizer configured to construct multimedia contents by synchronizing the signal-processed first multimedia data and the signal-processed second multimedia data based on the first time code and the second time code,
   wherein the signal data extractor and the synchronizer are implemented by at least one processor comprising the signal processor.

6. The receiving device of claim 5, wherein the second receiver is configured to receive information regarding segments of the second transmission data based on information in the second signaling data, and transmit the second transmission data on a segment basis based on the received information regarding the segments.

7. The receiving device of claim 5, wherein the first time code comprises time codes added to respective image frames in the first multimedia data, and the second time code comprises time codes added to respective image frames in the second multimedia data.

8. A transmitting method of a transmitting device, the method comprising:
   generating first transmission data comprising first multimedia data constituting first multimedia contents, first time code for synchronizing second multimedia data constituting second multimedia contents, first signaling data regarding the first multimedia data, and second signaling data regarding the second multimedia data;
   generating second transmission data comprising the second multimedia data and second time code for synchronizing the second multimedia data with the first multimedia data, the first time code and the second time code being synchronized with each other;
   transmitting the generated first transmission data through a broadcasting network; and
   transmitting the generated second transmission data through an Internet Protocol (IP) network,
   wherein the generating the first transmission data comprises:
      generating the first time code as first synchronization information;
      adding the generated first time code to the first multimedia data;
      encoding the first multimedia data added with the first time code;
      generating the first signaling data and the second signaling data; and
      generating the first transmission data by multiplexing the encoded first multimedia data, the first signaling data and the second signaling data, and
   wherein the generating the second transmission data comprises:
      generating the second time code corresponding to the first time code added to the first multimedia data as second synchronization information;
      adding the generated second time code to the second multimedia data; and
      encoding the second multimedia data added with the second time code.

9. The transmitting method of claim 8, wherein the first signaling data is recorded on at least one of program and system information protocol (PSIP) and program specific information (PSI) of the first transmission data, and the second signaling data is recorded on at least one of program and system information protocol (PSIP) and a private stream of the first transmission data.

10. The transmitting method of claim 8, wherein the transmitting the second transmission data comprises:
   dividing the second transmission data into a plurality of segments;
   generating information regarding a preset number of the segments; and
   transmitting the second transmission data on a segment basis according to the information regarding the preset number of segments.

11. A receiving method of a receiving device, the method comprising:
   receiving first transmission data comprising first multimedia data, first time code for synchronizing second multimedia data, first signaling data regarding the first multimedia data and second signaling data regarding the second multimedia data through a broadcasting network, the received first transmission data being encoded with the first time code, the encoded first multimedia data being multiplexed with the first signaling data and the second signaling data;
   receiving second transmission data comprising the second multimedia data and second time code for synchronizing the second multimedia data with the first multimedia data through an Internet Protocol (IP) network, the received second multimedia data being encoded with the second time code, the first time code time and the second time code being synchronized with each other;
   extracting the first signaling data and the second signaling data from the first transmission data;
   signal-processing the first multimedia data and the second multimedia data based on the extracted first signaling data and the extracted second signaling data; and
   synchronizing the first multimedia data and the second multimedia data based on the first time code and the second time code.

12. The receiving method of claim 11, wherein the receiving the second transmission data comprises:
   receiving information regarding segments of the second transmission data based on information comprised in the second signaling data; and
   receiving the second transmission data on a segment basis based on the received information regarding the segments.

13. The receiving method of claim 11, wherein the first time code comprises time codes added to respective image frames in the first multimedia data, and the second time code comprises time codes added to respective image frames in the second multimedia data.

* * * * *